US012794120B2

(12) United States Patent
Wan et al.

(10) Patent No.: US 12,794,120 B2
(45) Date of Patent: Nov. 10, 2026

(54) MULTI-BAND PHASE SHIFTER ASSEMBLY, MULTI-BAND ANTENNA SYSTEM AND BASE STATION ANTENNA

(71) Applicant: Outdoor Wireless Networks LLC, Claremont, NC (US)

(72) Inventors: Fangwen Wan, Suzhou (CN); Ting Zhang, Suzhou (CN); Dingshu Jin, Suzhou (CN); Yicheng Yin, Suzhou (CN); Junfeng Yu, Suzhou (CN); PuLiang Tang, Suzhou (CN); Chen Chen, Suzhou (CN); Honglei Fan, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 36 days.

(21) Appl. No.: 18/712,601

(22) PCT Filed: Nov. 17, 2022

(86) PCT No.: PCT/US2022/080003
§ 371 (c)(1),
(2) Date: May 22, 2024

(87) PCT Pub. No.: WO2023/102323
PCT Pub. Date: Jun. 8, 2023

(65) Prior Publication Data

US 2025/0015494 A1 Jan. 9, 2025

(30) Foreign Application Priority Data

Nov. 30, 2021 (CN) ......................... 202111437201.4
Mar. 15, 2022 (CN) ......................... 202210250993.2

(51) Int. Cl.
*H01Q 3/32* (2006.01)
*H01P 1/18* (2006.01)
(Continued)

(52) U.S. Cl.
CPC ................. *H01Q 3/32* (2013.01); *H01P 1/18* (2013.01); *H01Q 1/246* (2013.01); *H01Q 5/314* (2015.01)

(58) Field of Classification Search
None
See application file for complete search history.

(56) References Cited

U.S. PATENT DOCUMENTS 10,498,028 B2 12/2019 Xiao et al.
2008/0024385 A1* 1/2008 Zimmerman .......... H01Q 1/246 343/905
(Continued)

FOREIGN PATENT DOCUMENTS

CN 209200117 U * 8/2019
CN 107710498 B 1/2020
(Continued)

OTHER PUBLICATIONS

"International Search Report and Written Opinion of the International Searching Authority", International Application No. PCT/US2022/080003, Mar. 29, 2023, 12 pp.

*Primary Examiner* — Dameon E Levi
*Assistant Examiner* — Anh Ho
(74) *Attorney, Agent, or Firm* — Myers Bigel, P.A.

(57) ABSTRACT

A multi-band phase shifter assembly comprises: a first substrate; a first rotary wiper arm phase shifter, configured to phase shift a first RF signal in a first frequency band; a second rotary wiper arm phase shifter, configured to phase shift a second RF signal in a second frequency band; first filters, configured to pass the first RF signal while blocking the second RF signal, the input end of each first filter is connected to a corresponding output port of the first rotary wiper arm phase shifter; second filters, configured to pass the second RF signal while blocking the first RF signal, the input end of each second filter is connected to a correspond-
(Continued)

ing output port of the second rotary wiper arm phase shifter; and a conductive structure, configured to electrically connect one input end of the first filters with one output end of the second filters.

16 Claims, 18 Drawing Sheets

(51) Int. Cl.
*H01Q 1/24* (2006.01)
*H01Q 5/314* (2015.01)

(56) References Cited

U.S. PATENT DOCUMENTS

2011/0063049 A1* 3/2011 Bradley .................. H01P 1/184 333/161
2011/0069644 A1* 3/2011 Kim ..................... H04B 1/0057 370/278
2015/0200467 A1* 7/2015 Kurk ...................... H01Q 1/241 343/853
2016/0111785 A1* 4/2016 Park ......................... H01Q 3/30 343/858
2018/0108990 A1 4/2018 Xiao et al.
2018/0159563 A1 6/2018 Khlat et al.
2019/0074602 A1 3/2019 Kurk et al.
2019/0273317 A1* 9/2019 Xiao ...................... H01Q 1/246
2019/0334636 A1* 10/2019 Li .......................... G01R 29/10
2020/0006848 A1 1/2020 Ding et al.
2021/0151879 A1 5/2021 Litteer
2023/0127406 A1* 4/2023 Liu ......................... H01P 1/184 343/702

FOREIGN PATENT DOCUMENTS

CN 113823884 A * 12/2021 ................ H01P 1/18
EP 3291362 B1 1/2020
JP H0425777 A * 1/1992

* cited by examiner

MULTI-BAND PHASE SHIFTER ASSEMBLY, MULTI-BAND ANTENNA SYSTEM AND BASE STATION ANTENNA

CROSS-REFERENCE TO RELATED APPLICATIONS

The present application is a 35 U.S.C. § 371 national stage application of PCT Application No. PCT/US2022/080003, filed on Nov. 17, 2022, which itself claims priority to Chinese Patent Application No. 202210250993.2, filed Mar. 15, 2022 and to Chinese Patent Application No. 202111437201.4, filed Nov. 30, 2021, the entire content of each of which is incorporated herein by reference as if set forth fully herein.

FIELD

The present disclosure generally relates to the field of base station antennas, and more specifically, to a multi-band phase shifter assembly, a multi-band antenna system, and a base station antenna.

BACKGROUND

Cellular communications systems are well known in the art. In a cellular communications system, a geographic area is divided into a series of sections that are referred to as "cells" which are served by respective base stations. The base station may include one or more base station antennas that are configured to provide two-way radio frequency ("RF") communications with mobile subscribers that are within the cell served by the base station.

In order to accommodate the ever-increasing volumes of cellular communications, cellular operators have added cellular services in a variety of new frequency bands. In some cases, it is possible to use linear arrays of so-called "wide-band" or "ultra-wide-band" radiating elements to provide service in multiple frequency bands. Therefore, for example, a radiating element operating within a frequency range of 1.7 to 2.7 GHz can be used to support cellular services in multiple different frequency bands. Base station antennas may also typically include multiple radiating element arrays, and these arrays are designed to operate in different frequency bands. For example, in a common multi-band antenna system, the antenna may have at least one linear array of one or more "low-band" radiating elements providing service in some or all of 617 to 960 MHz frequency bands (for example, Digital Dividend and/or GSM900 at 790 to 862 MHZ) and at least one linear array of "medium-band" radiating elements providing service in some or all of, for example, 1427 to 2690 MHz frequency bands (for example, UTMS and/or GSM1800 at 1920 to 2170 MHz). However, the multi-band antenna often has an increased width to adapt to an increased number of radiating element arrays. Due to local zoning ordinances and/or weights of antenna towers and wind loading constraints, etc., there are often limitations on the sizes of base station antennas that can be deployed at a given base station. These constraints may effectively limit the number of radiating element arrays that may be included in the multi-band antenna.

Furthermore, phase shifters for different frequency bands can also be provided in such a multi-band antenna system to adjust the dip angle of the radiation pattern or the "antenna beam" generated by each radiating element array. Such down adjustment can be used to adjust the coverage area of each radiating element array.

However, with the integration of more and more frequency bands and more and more functional modules (for example, phase shifters, filters, coaxial cables and radiating element arrays, etc.) in the base station antenna, the installation space and/or operation space (such as welding space) in the base station antenna is further restricted. Therefore, improving the space utilization rate of the base station antenna is an urgent problem to be solved. In addition, the installation space and/or operation space in the base station antenna should also be improved.

SUMMARY

According to a first aspect of the present disclosure, a multi-band phase shifter assembly is provided, comprising: a first substrate; a first rotary wiper arm phase shifter arranged on a first surface of the first substrate, the first rotary wiper arm phase shifter being configured to perform a phase shift operation on a first radio frequency signal in a first frequency band; a second rotary wiper arm phase shifter arranged on a second surface of the first substrate opposite to the first surface, the second rotary wiper arm phase shifter being configured to perform a phase shift operation on a second radio frequency signal in a second frequency band, the second frequency band being different from the first frequency band; first filters, which are configured to pass the first radio frequency signal while blocking the second radio frequency signal, wherein an input end of each first filter is connected to a corresponding output port of the first rotary wiper arm phase shifter; second filters, which are configured to pass the second radio frequency signal while blocking the first radio frequency signal, wherein an input end of each second filter is connected to a corresponding output port of the second rotary wiper arm phase shifter; and a conductive structure spanning the first substrate, the conductive structure being configured to electrically connect an output end of a first filter with a corresponding output end of a second filter so as to be electrically connected together to a common output port of the multi-band phase shifter assembly.

According to a second aspect of the present disclosure, a multi-band antenna system is provided, comprising: at least one multi-band phase shifter assembly according to various embodiments of the present disclosure; a radiating element array, which is configured to be capable of operating in at least a first frequency band and a second frequency band, wherein a common output port of the multi-band phase shifter assembly is electrically connected with at least a part of the radiating elements in the radiating element array.

According to a third aspect of the present disclosure, a base station antenna is provided. The base station antenna includes the multi-band antenna system according to various embodiments of the present disclosure.

DETAILED DESCRIPTION

Figure 1:
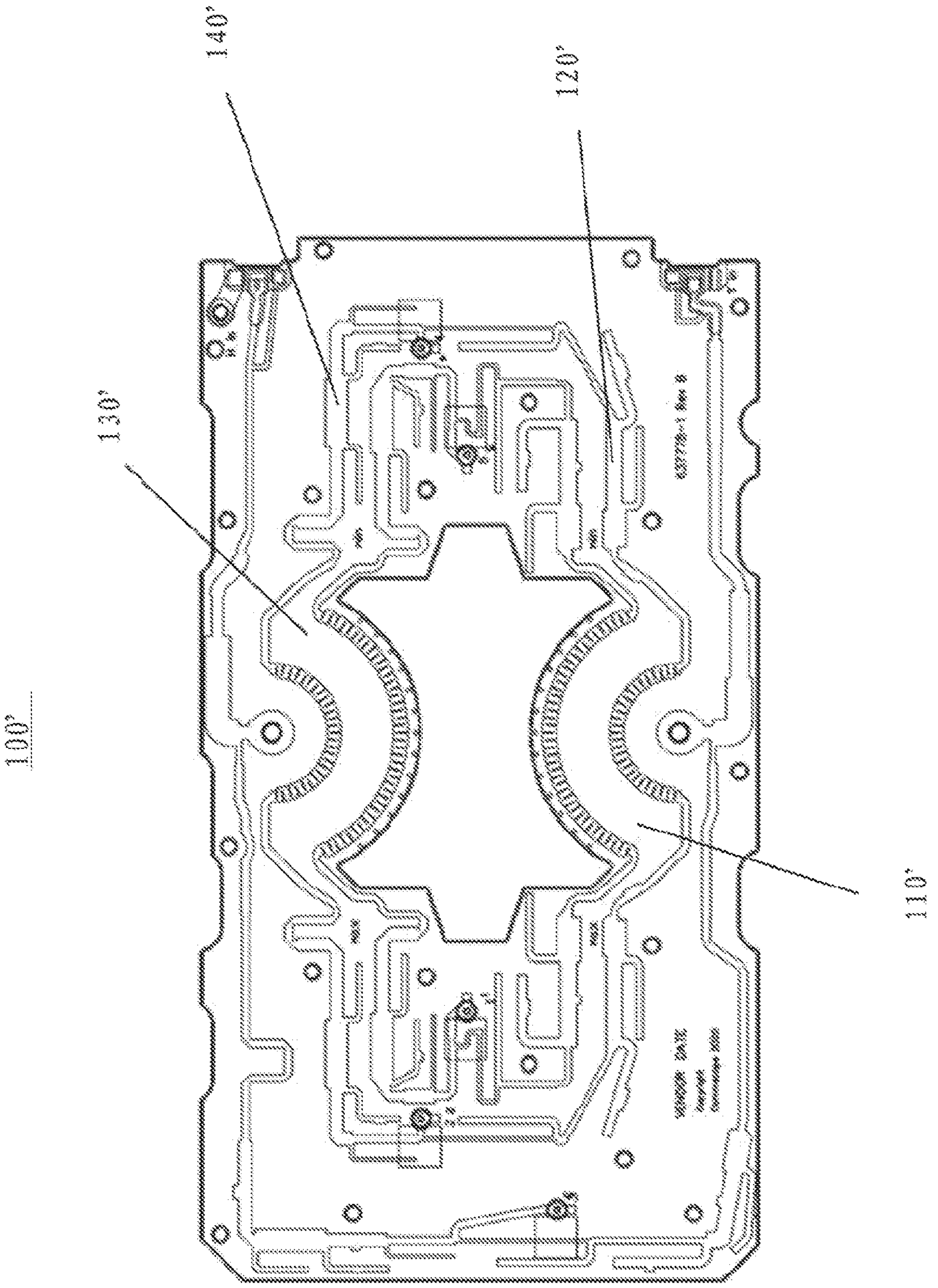
FIG. 1 is a schematic view of a multi-band phase shifter assembly.

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that the terms used herein are only used to describe specific examples, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features". The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "schematic" or "exemplary" means "serving as an example, instance or explanation", not as a "model" to be accurately copied". Any realization method described exemplarily herein may not be necessarily interpreted as being preferable or advantageous over other realization methods. Furthermore, the present disclosure is not limited by any expressed or implied theory given in the above technical field, background art, summary of the invention or embodiments.

As used herein, the word "basically" means including any minor changes caused by design or manufacturing defects, device or component tolerances, environmental influences, and/or other factors.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

FIG. 1 shows a schematic view of a multi-band phase shifter assembly 100'. The multi-band phase shifter assembly 100' integrates a first phase shifter 110' for a first radio frequency signal of a first frequency band, a first filter circuit 120' coupled to the first phase shifter 110', a second phase shifter 130' for a second radio frequency signal of a second frequency band, and a second filter circuit 140' coupled to the second phase shifter 130' Each phase shifter may be configured as a variable differential, arcuate phase shifter or a rotary wiper arm phase shifter as described in U.S. Pat. No. 7,907,096 (which is incorporated into the present disclosure by reference. In the corresponding arcuate phase shifter, the rotatable wiper arm (not shown) couples the RF signal to the selected position along the fixed arc-shaped transmission line. However, the first phase shifter 110' and the second phase shifter 130' are arranged side by side in the vertical direction on the same plane, and thus the multi-band phase shifter assembly 100' needs to occupy a relatively large space. Moreover, the space utilization rate of such a structure is not very high. As shown in FIG. 1, the free space marked with a thick solid line between the two phase shifters is a waste of space. As the number of phase shifters increases, the issue of space utilization will become more noteworthy.

Based on the above structure of the first phase shifter 110' and the second phase shifter 130', a welding operation is needed on the back of the multi-band phase shifter assembly 100' in order to electrically connect the output end of the first phase shifter 110' to the corresponding coaxial cable, which is relatively costly. In addition, as shown in FIG. 1, each coaxial cable is welded to the first phase shifter 110' at the corresponding intersection of the first filter circuit 120' and the second filter circuit 140', which may place the corresponding welding position to be in an area where welding is difficult, thus further increasing the difficulty of the welding operation on the back side.

Next, a multi-band antenna system 10 according to some embodiments of the present disclosure and a multi-band phase shifter assembly 100 included therein will be described with reference to FIGS. 2 to 9.

Figure 2:
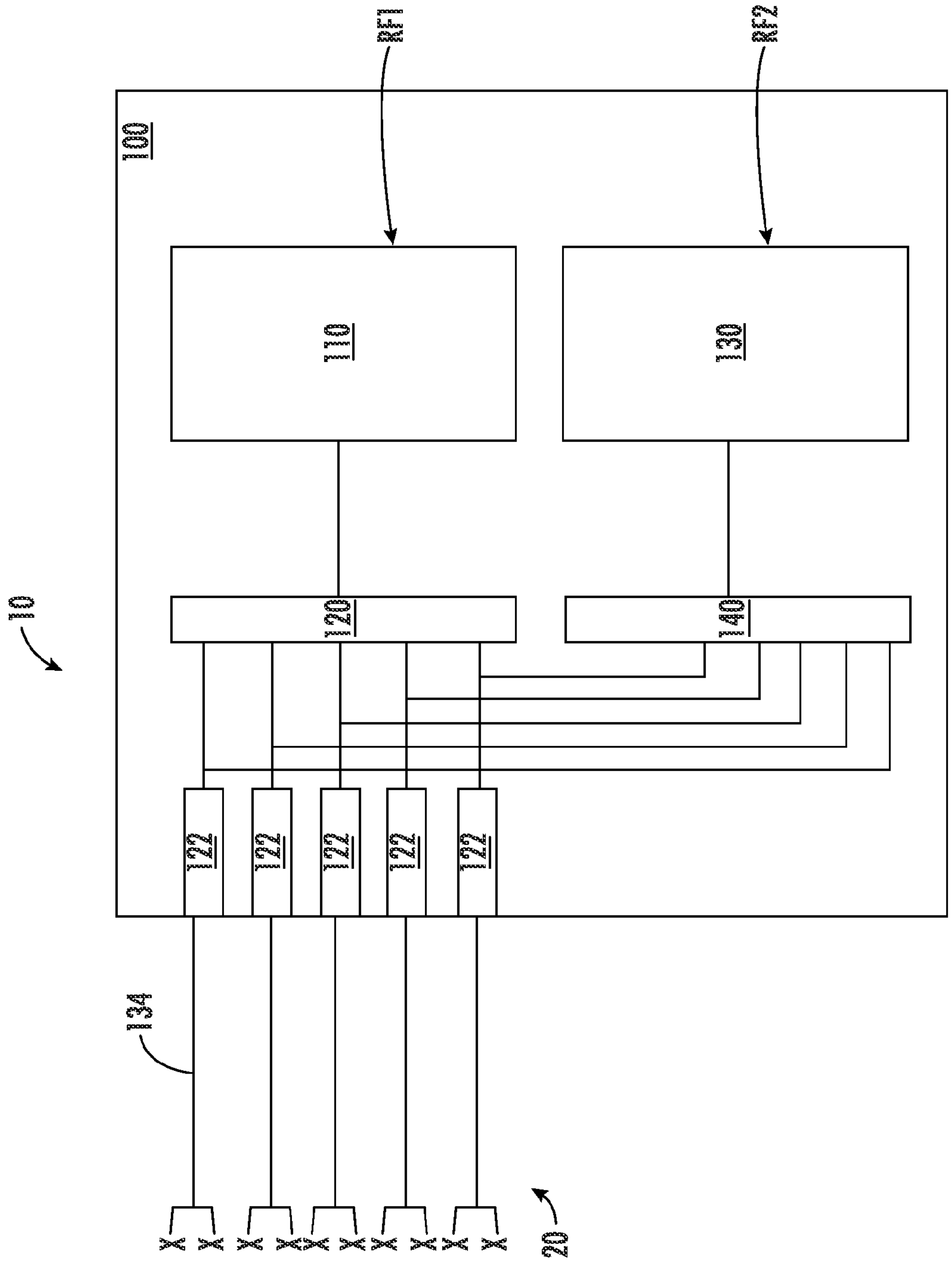
FIG. 2 is a schematic block diagram of a multi-band antenna system according to some embodiments of the present disclosure.
Figure 3:
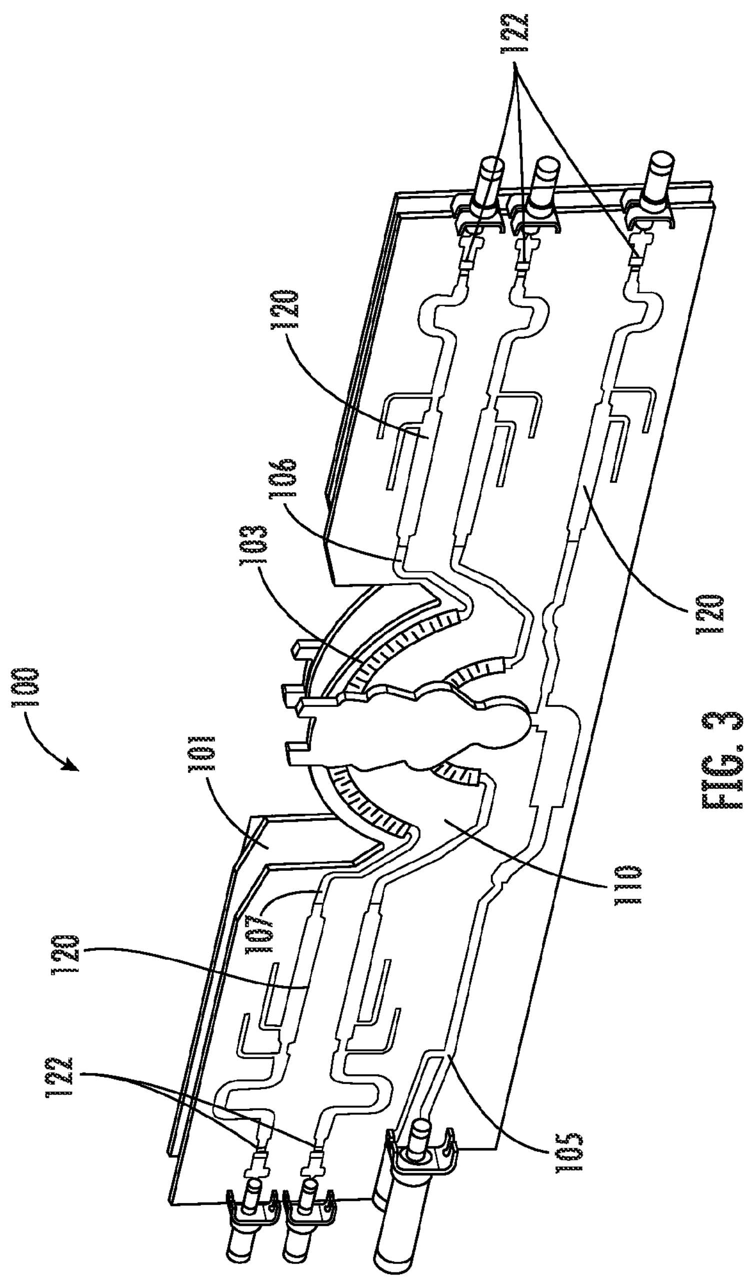
FIG. 3 is a perspective view of a multi-band phase shifter assembly that may be used in the multi-band antenna system of FIG. 2 according to some embodiments of the present disclosure.
Figure 4:
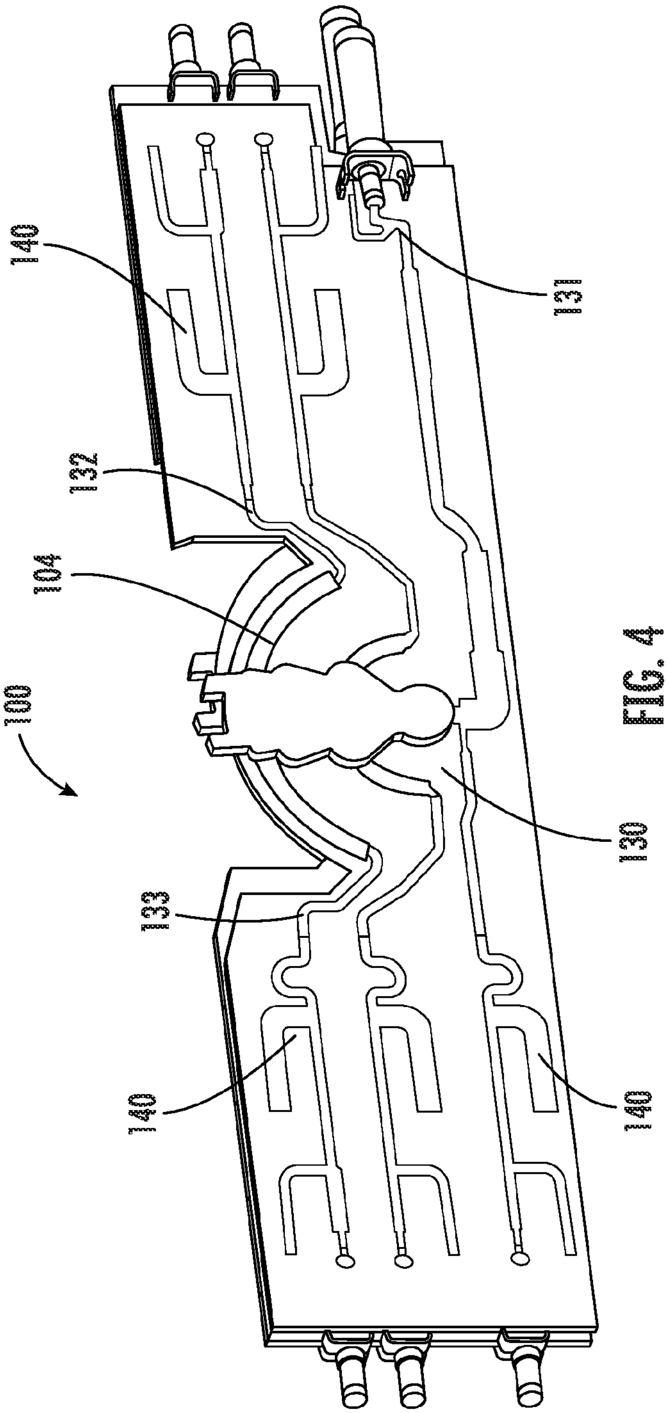
FIG. 4 is a back side view of the multi-band phase shifter assembly of FIG. 3.

Referring to FIGS. 2 to 4, FIG. 2 shows a schematic block diagram of the multi-band antenna system 10 according to some embodiments of the present disclosure. FIG. 3 shows a perspective view of the multi-band phase shifter assembly 100 according to some embodiments of the present disclosure. FIG. 4 shows a back side view of the multi-band phase shifter assembly 100.

The multi-band antenna system 10 may include at least one radiating element array 20 (which may be configured as a wideband radiating element array 20 capable of operating in a first frequency band and a second frequency band) and the multi-band phase shifter assembly 100. The multi-band phase shifter assembly 100 may be configured to receive one or more radio frequency signals in different frequency bands from a radio device (called a Radio), and feed the corresponding radio frequency signals to the radiating element array 20 after performing a phase shift operation on the corresponding radio frequency signals. As shown in FIG. 2, the multi-band phase shifter assembly 100 may be configured to receive a first radio frequency signal RF1 in a first frequency band from a radio and a second radio frequency signal RF2 in a second frequency band from the radio via a corresponding coaxial cable, and feed each phase-shifted sub-component of the first radio frequency signal and each phase-shifted sub-component of the second radio frequency signal to the radiating element array 20 via the corresponding coaxial cable.

The multi-band phase shifter assembly 100 may include a first substrate 101 (for example, a dielectric substrate), a first phase shifter 110 configured to perform a phase shift operation on the first radio frequency signal in the first frequency band, a first filter 120 coupled to the first phase shifter 110, a second phase shifter 130 configured to perform a phase shift operation on the second radio frequency signal in the second frequency band, and a second filter 140 coupled to the second phase shifter 130.

The first phase shifter 110 and the second phase shifter 130 of the multi-band phase shifter assembly 100 according to some embodiments of the present disclosure may form a superimposed structure. The first phase shifter 110 may be arranged on a first surface of the first substrate 101, and the second phase shifter 130 may be arranged on a second surface of the first substrate 101 opposite to the first surface. This superimposed structure is advantageous. The wiring flexibility of each phase shifter together with the corresponding filter can be improved, and thus some of the problems involved in the phase shifter 110' of FIG. 1 can be avoided. In other words, based on this superimposed structure, the unnecessary free space marked with a thick solid line in FIG. 1 can be eliminated or reduced. In addition, based on wiring flexibility, a welding end 122 for a corresponding coaxial cable 134 may be provided at a lateral edge of the multi-band phase shifter assembly 100, thereby facilitating the welding operation. Further, based on this superimposed structure, the width of the multi-band phase shifter assembly 100 can be significantly reduced, for example, by at least half compared to the case of FIG. 1, thereby forming a compact structure. In some embodiments, the width of each phase shifter can be less than 100 mm, 90 mm, 80 mm, 70 mm or even 50 mm, which is extremely advantageous for the originally compact internal space.

As shown in FIGS. 3 and 4, the first phase shifter 110 and the second phase shifter 130 may be respectively configured as, for example, a rotary wiper arm phase shifter. The first phase shifter 110 and the second phase shifter 130 may be superimposed with each other such that a first printed trace 103 and a second printed trace 104 extend at least partially overlapping with each other. In other words, the first phase shifter 110 and the second phase shifter 130 may be respectively arranged on opposite surfaces with the same orientation, so that the contour of the first phase shifter 110 and the contour of the second phase shifter 130 substantially overlap and the trajectories of the corresponding arc-shaped transmission lines at least partially overlap or substantially overlap.

The first rotary wiper arm phase shifter 110 may include a first input port 105, a first output port 106, a second output port 107, and a first printed trace 103 (an arc-shaped transmission line in the drawing) and a first wiper arm electrically connected between the first output port and the second output port. In some embodiments, the first wiper arm may be configured as a first wiper arm printed circuit element, and a first coupling portion coupled to the first input port of the first rotary wiper arm phase shifter 110 via a printed trace and a second coupling portion coupled to the first printed trace are printed on the first wiper arm printed circuit element. The first wiper arm may be configured to couple the first input port to the first printed trace and to be capable of sliding relative to the first printed trace so as to adjust the phase change experienced by the sub-component of the RF signal from the first input port to the corresponding output port. In other words, the rotatable first wiper arm can variably couple the position of the first radio frequency signal from the first input port to the fixed arc-shaped transmission line to perform a phase shift operation for the first radio frequency signal.

The second rotary wiper arm phase shifter 130 may include a second input port 131, a third output port 132, a fourth output port 133, and a second printed trace 104 (an arc-shaped transmission line in the drawing) and a second wiper arm electrically connected between the third output port and the fourth output port. In some embodiments, the second wiper arm may be configured as a second wiper arm printed circuit element, and a third coupling portion coupled to the second input port of the second rotary wiper arm phase shifter 130 via a printed trace and a fourth coupling portion coupled to the second printed trace are printed on the second wiper arm printed circuit element. The second wiper arm may be configured to couple the second input port to the second printed trace and to be capable of sliding relative to the second printed trace so as to adjust the phase change experienced by the sub-component of the RF signal from the second input port to the corresponding output port. In other words, the rotatable second wiper arm can variably couple the position of the second radio frequency signal from the second input port to the fixed arc-shaped transmission line to perform a phase shift operation for the second radio frequency signal.

Each phase shifter may have, for example, 5, 7, 9 or more output ports. In the illustrated embodiment, the phase shifter has five output ports, of which four are differentially variably phase-shifted and one maintains an output of a fixed phase. However, an output that has a fixed phase relation with the input is optional. As a result, the first phase shifter 110 and the second phase shifter 130 may respectively perform 1:5 of power distribution along the radio transmission direction. In other embodiments, the first phase shifter 110 and the second phase shifter 130 may also respectively perform, for example, 1:7 or 1:9 or other ratios of power distribution along the radio transmission direction.

It should be understood that those skilled in the art can easily recognize other types of phase shifters, such as cavity phase shifters, which can be used without departing from the scope and spirit of the present disclosure.

As shown in FIG. 2, the first filter 120 is schematically depicted as a filter module, the input end of which is connected to a corresponding output port of the first rotary wiper arm phase shifter 110. Similarly, the second filter 140 is schematically depicted as a filter module, the input end of which is connected to a corresponding output port of the second rotary wiper arm phase shifter 130. An output end of the first filter 120 and a corresponding output end of the second filter 140 may be electrically connected with each other and together electrically connected to or jointly form a common output port 122 of the multi-band phase shifter assembly 100. In other words, each common output port 122 of the multi-band phase shifter assembly 100 may be electrically connected to an output end of the first filter 120 and an output end of the second filter 140, respectively. In the illustrated embodiment, the multi-band phase shifter assembly 100 exemplarily has five common output ports 122, which respectively feed the corresponding radiating elements.

In the illustrated embodiment, the first filter 120 provided for the first rotary wiper arm phase shifter 110 and the second filter 140 provided for the second rotary wiper arm phase shifter 130 may be printed as filter microstrip lines (for example, resonant stubs, or stepped impedance microstrip lines) on corresponding circuit printed boards and printed integrally with corresponding phase shift circuits. In other words, the first rotary wiper arm phase shifter 110 and the corresponding first filter 120 may be integrated on a first printed circuit board, and the second rotary wiper arm phase shifter 130 and the corresponding second filter 140 may be integrated on a second printed circuit board. Such an integration structure is advantageous in that it can simplify the composition of the antenna system and can also save space. For example, unnecessary cable connections can be omitted.

The first filter 120 may be configured to pass the first radio frequency signal while blocking the second radio frequency signal, and the second filter 140 may be configured to pass the second radio frequency signal while blocking the first radio frequency signal. In some embodiments, the first filter 120 and the second filter 140 may be respectively configured as band-rejection filters. In some embodiments, the first filter 120 and the second filter 140 may be respectively configured as band-pass filters.

In the illustrated embodiment, a corresponding filter may be configured as a resonant stub, which can be used as a band-rejection filter to block energy in a specific frequency band. The resonant frequency mainly depends on the length of the stub and how the stub is terminated, for example, a quarter-wavelength open stub or a half-wavelength short-circuit stub.

It should be understood that those skilled in the art can easily recognize other types of filters, which can be used without departing from the scope and spirit of the present disclosure. In some embodiments, the filter may be configured separately from the phase shifter and may be electrically connected with each other via a coaxial cable. In some embodiments, the first filter 120 and/or the second filter 140 may be configured as notch filters, respectively. In some embodiments, the first filter 120 and/or the second filter 140 may be configured as cavity filters, respectively. Details are not described herein again.

Figure 5:
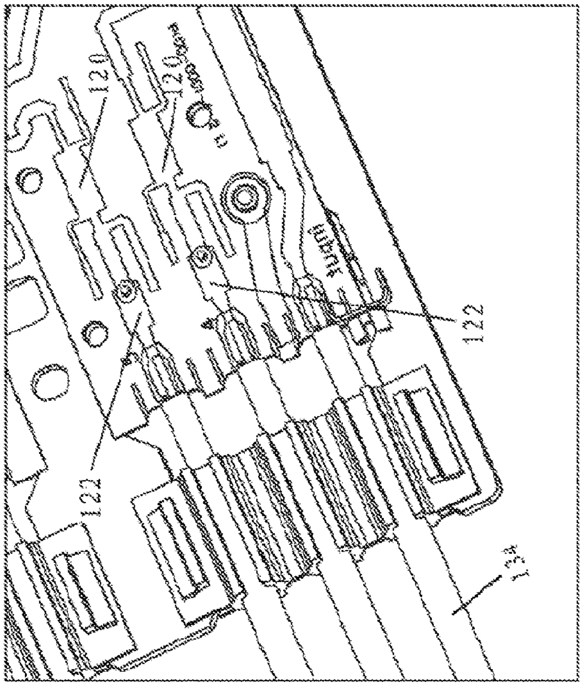
FIG. 5 is a partial view of the multi-band phase shifter assembly of FIG. 3.
Figure 6:
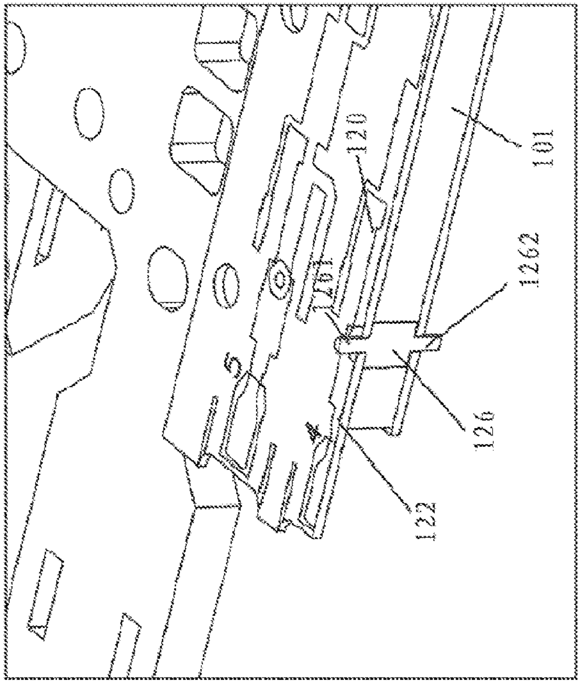
FIG. 6 is a partial sectional perspective view of FIG. 5 to show a conductive structure in the multi-band phase shifter assembly.
Figure 7:
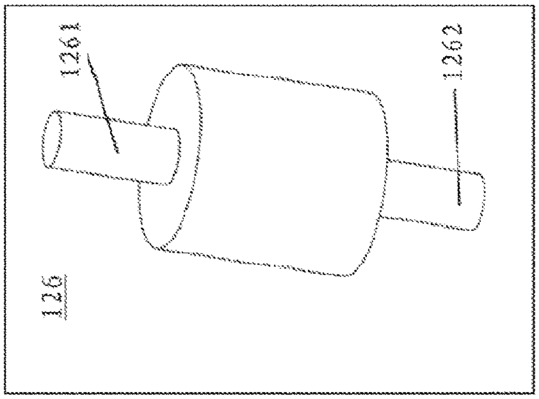
FIG. 7 is a schematic view of the conductive structure in the multi-band phase shifter assembly of FIG. 5.

Referring to FIGS. 5, 6 and 7, a conductive structure 126 for electrically connecting the first filter 120 and the second filter 140 in the multi-band phase shifter assembly 100 according to some embodiments of the present disclosure is shown in detail. As shown in FIG. 5, the multi-band phase shifter assembly 100 can feed the sub-component of each radio frequency signal to the radiating element array 20 via the coaxial cable 134. A common output port 122 or welding end for electrically connecting the coaxial cable is provided on the multi-band phase shifter assembly 100. These common output ports 122 or welding ends may be arranged at a lateral edge of the multi-band phase shifter assembly 100 or the corresponding printed circuit board, so that the end portion of the coaxial cable reaches the welding end in a direction substantially parallel to the printed circuit board and is welded thereto. Such a welding operation is relatively efficient and simple.

Continuing to refer to FIG. 5, each common output port 122 may be electrically connected to an output end of the first filter 120 as a whole. An output end of the second filter 140 on the back side may be electrically connected to the corresponding output end of the first filter 120 via the conductive structure 126 (see in FIGS. 6-7) and then electrically connected to the corresponding common output port 122. The first radio frequency signal from the radio may reach the common output port 122 via the first phase shifter 110 and the first filter 120 and be fed to the radiating element array 20 from the coaxial cable welded to the common output port 122. The second radio frequency signal from the radio may reach the common output port 122 via the second phase shifter 130, the second filter 140, and the conductive structure 126 and be fed to the radiating element array 20 from the coaxial cable welded to the common output port 122.

FIG. 6 shows an exemplary view in which the conductive structure 126 spans the first substrate 101. A channel may be provided on the first substrate 101. A first opening corresponding to the channel is provided on the first printed circuit board, and a second opening corresponding to the channel is provided on the second printed circuit board. A first end portion 1261 of the conductive structure 126 is electrically connected, for example, welded, to an output end of the first filter 120 via the first opening, and a second end portion 1262 of the conductive structure 126 is electrically connected, for example, welded, to an output end of the second filter 140 via the second opening, thereby achieving an electrical connection between an output end of the first filter 120 and a corresponding output end of the second filter 140.

FIG. 7 shows the exemplary conductive structure 126 in FIG. 6, which is configured in the form of a metal conductive pillar. The conductive structure 126 includes a narrow section as an electrical connection end and a widened section configured to be received in the channel.

It should be understood that those skilled in the art can easily recognize other types of conductive structures 126, which can be used without departing from the scope and spirit of the present disclosure. In some embodiments, the conductive structure 126 may be configured as a coaxial connector.

Next, a multi-band phase shifter assembly 100 integrated with a plurality of phase shifters according to some embodiments of the present disclosure will be described with reference to FIGS. 8 and 9.

Figure 8:
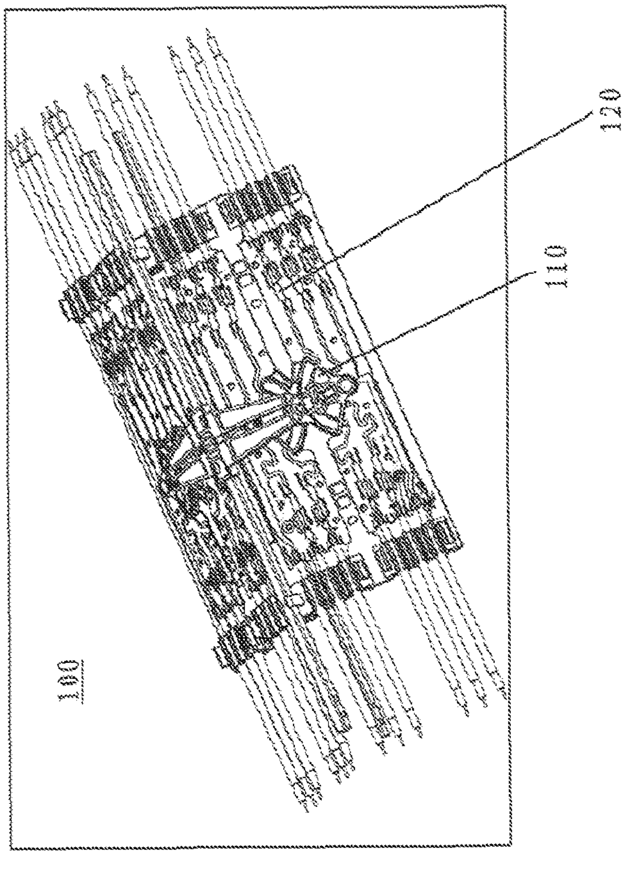
FIG. 8 is a perspective view of a multi-band phase shifter assembly integrated with a plurality of phase shifters according to some embodiments of the present disclosure.

FIG. 8 shows a front view of the multi-band phase shifter assembly 100. The multi-band phase shifter assembly 100 may include a plurality of (four are exemplarily shown in the drawing) first rotary wiper arm phase shifter 110 and a plurality of corresponding first filters 120 integrated on the front. Every two first rotary wiper arm phase shifters 110 and the plurality of first filters 120 are arranged side by side and extend in respective planes that intersect at an oblique angle. As an example, the four first rotary wiper arm phase shifters 110 on the front may be responsible for the phase shift of the first radio frequency signals of the two radiating element arrays 20 under two polarizations (for example, ±45 polarizations). The plurality of first rotary wiper arm phase shifters 110 may perform a phase shift operation via a first operating lever.

Figure 9:
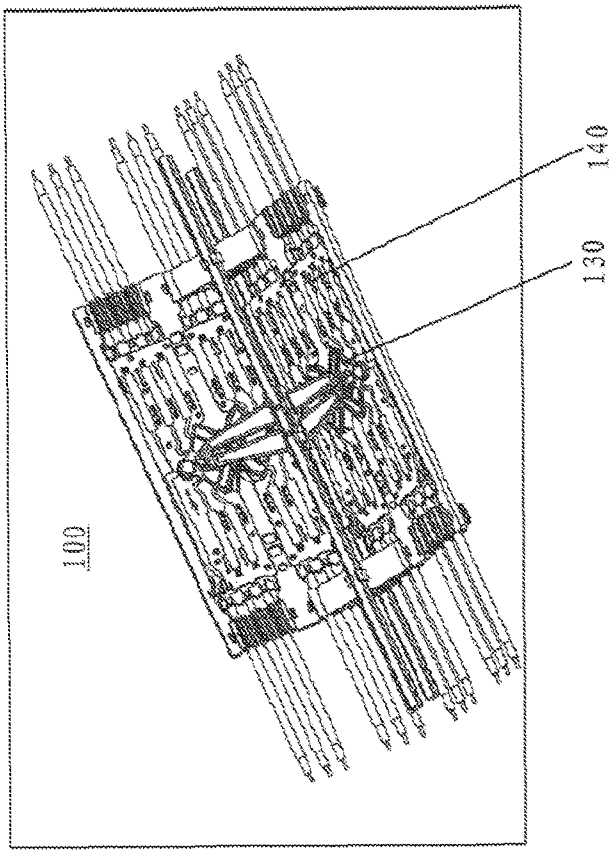
FIG. 9 is a back side view of the multi-band phase shifter assembly of FIG. 8.

FIG. 9 shows a back side view of the multi-band phase shifter assembly 100. The multi-band phase shifter assembly 100 may include a plurality of (four are exemplarily shown in the drawing) second rotary wiper arm phase shifters 130 and a plurality of corresponding second filters 140 integrated on the back. Every two second rotary wiper arm phase shifters 130 in the plurality of second filters 140 are arranged side by side and facing each other. As an example, the four second rotary wiper arm phase shifters 130 on the back may be responsible for the phase shift of the second radio frequency signals of the two radiating element arrays 20 under two polarizations (for example, ±45 polarizations). The plurality of second rotary wiper arm phase shifters 130 may perform a phase shift operation via a second operating lever.

It should be understood that those skilled in the art can easily recognize further extended solutions of the multi-band phase shifter assembly 100, which can be used without departing from the scope and spirit of the present disclosure.

In some embodiments, the multi-band phase shifter assembly 100 may be extended to three or more RF frequency bands. As a result, the multi-band phase shifter assembly 100 may be configured as a three-layered or more-layered structure. Taking a three-layered structure as an example, the multi-band phase shifter assembly 100 may additionally include a third rotary wiper arm phase shifter, a plurality of corresponding third filters, a second substrate (located between the first rotary wiper arm phase shifter and the third rotary wiper arm phase shifter), and a conductive structure spanning the second substrate. The third rotary wiper arm phase shifter may be configured to perform a phase shift operation on a third radio frequency signal in a third frequency band, and the third filter may be configured to pass the third radio frequency signal while blocking the first radio frequency signal and the second radio frequency signal. Here, the input end of each third filter is connected to a corresponding output port of the third rotary wiper arm phase shifter, and the conductive structure spanning the second substrate is configured to electrically connect an output end of the third filter to a corresponding output end of the first filter. An output end of the first filter may be directly electrically connected to the corresponding common output port. An output end of the second filter may be electrically connected to the corresponding common output port via the conductive structure. Moreover, an output end of the third filter may be electrically connected to the corresponding common output port via the conductive structure.

In some embodiments, the number of phase shifters and the number of ports on the filters may increase with each additional frequency band. Additionally, the multi-band phase shifter assembly 100 may be configured for high-band or low-band operations. In an example relating to low-band frequencies, the first frequency band may include 880 to 960 MHz and the second frequency band may include 790 to 862 MHz. In another example relating to high-band frequencies, the first frequency band may include 1710 to 1880 MHz and the second frequency band may include 1920 to 2170 MHz. Regarding this example, alternatively, a third frequency band of 2.5 to 2.7 GHZ may be included. In another alternative embodiment, the first frequency band may be 1710 to 2170 MHz and the second frequency band may be 2.5 to 2.7 GHZ.

Figure 10A:
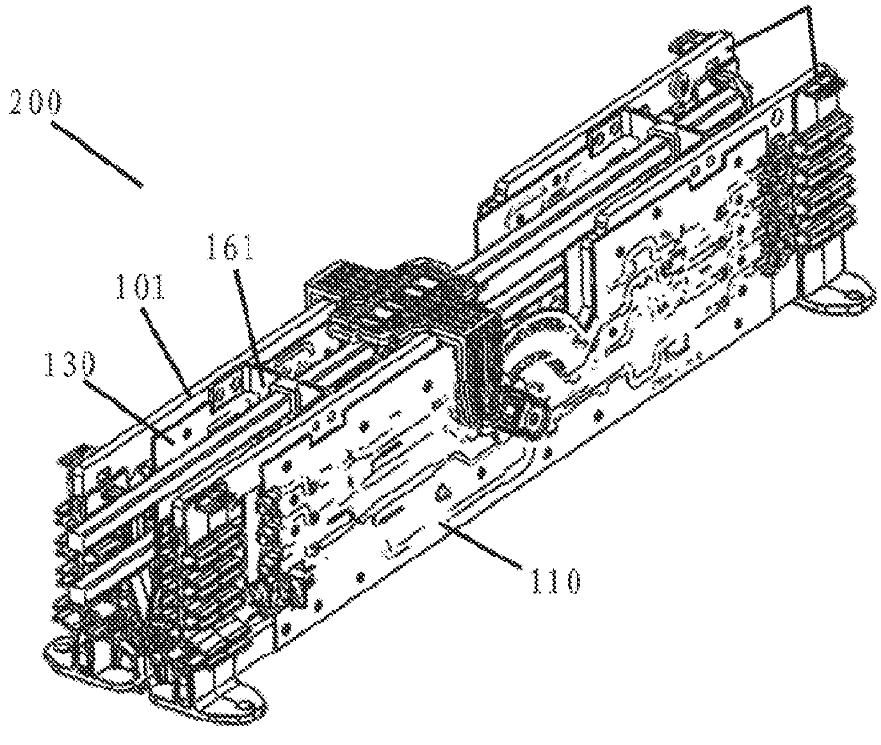
FIGS. 10A and 10B are top and bottom perspective views of a multi-band phase shifter system respectively.
Figure 10B:
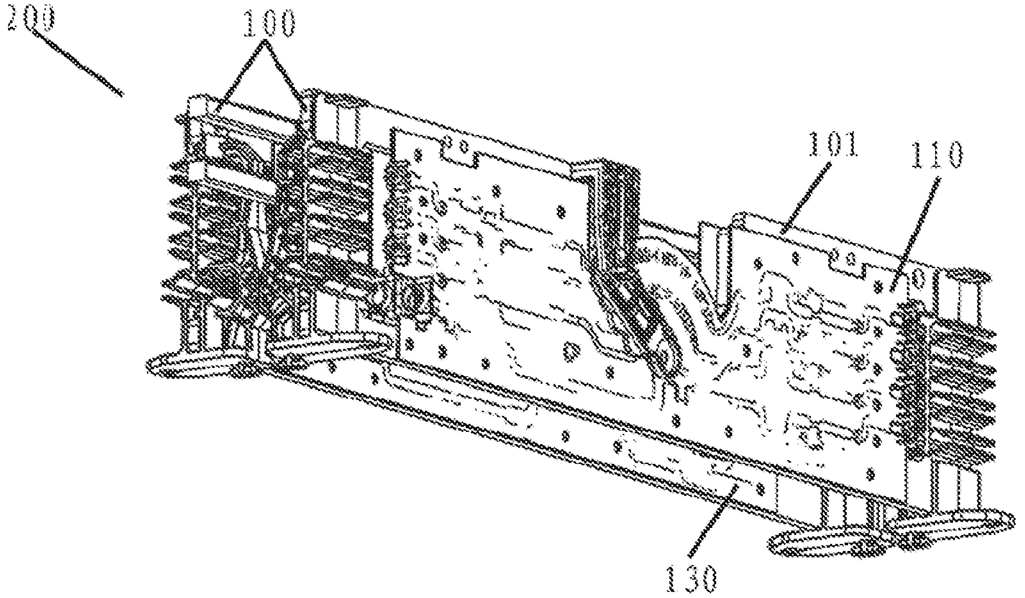
Figure 11A:
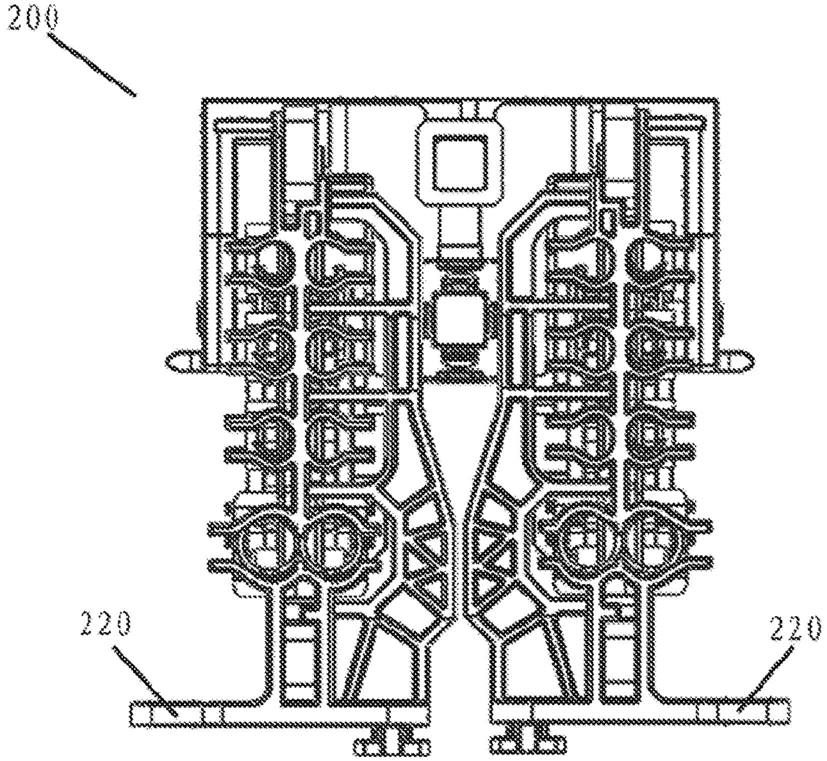
FIGS. 11A and 11B are a front view and a rear view of the multi-band phase shifter system respectively.
Figure 11B:
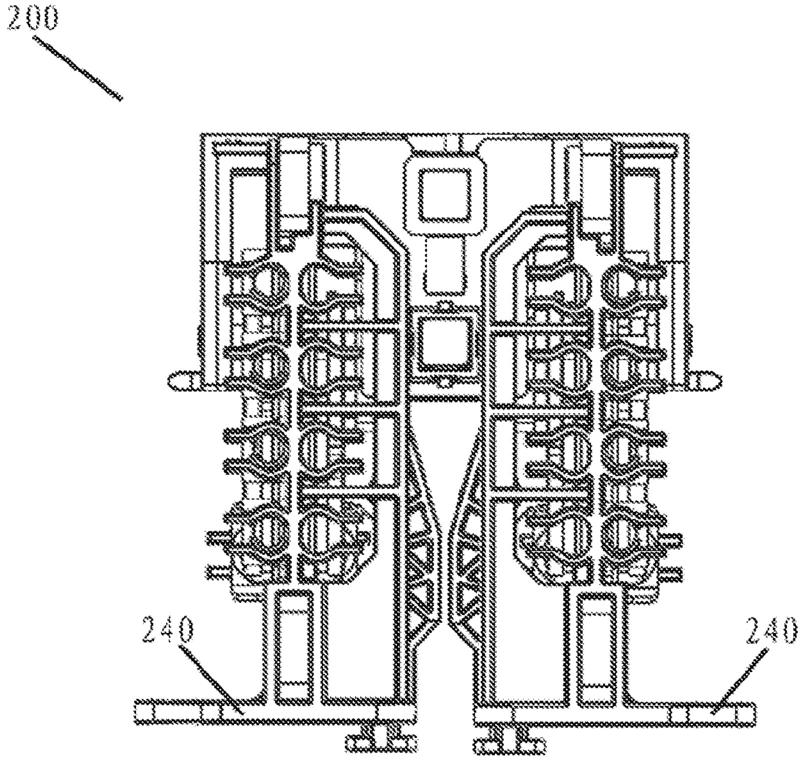
Figure 11C:
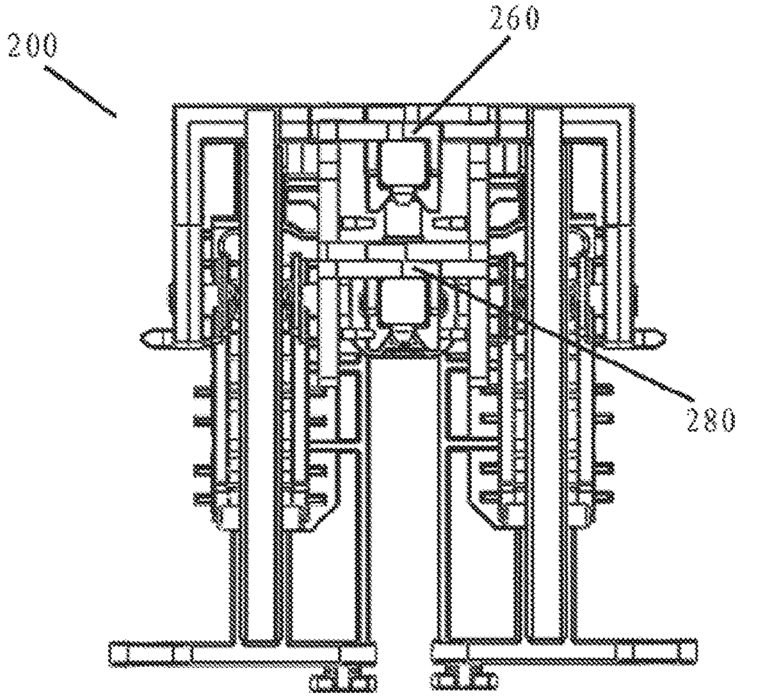
FIGS. 11C and 11D are respectively a front view and a rear view of the multi-band phase shifter system with the corresponding support frame removed.
Figure 11D:
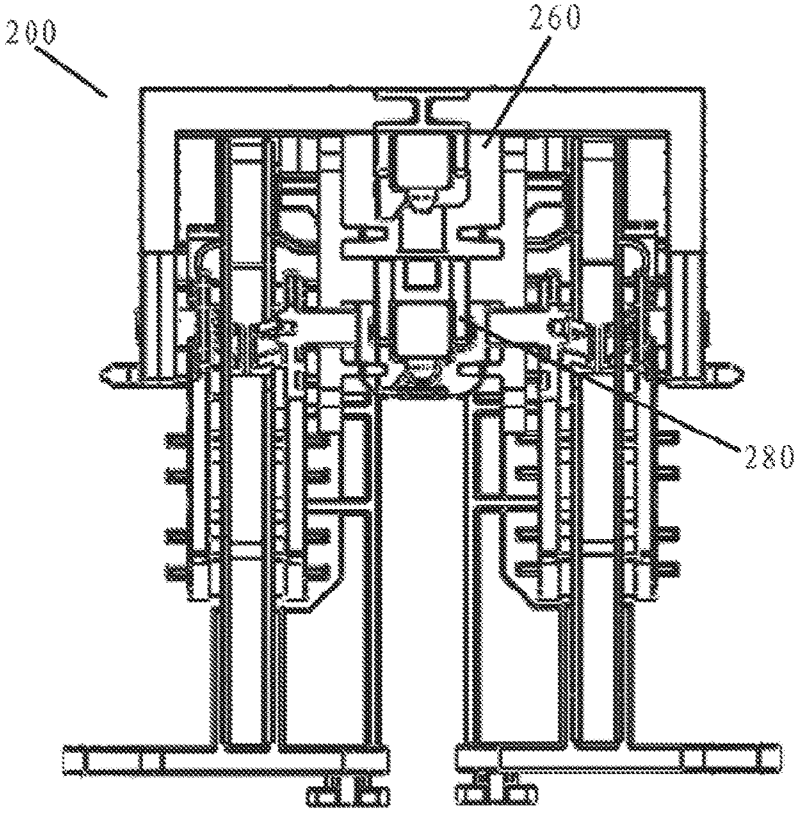

FIGS. 10A and 10B are top and bottom perspective views of a multi-band phase shifter system 200 respectively. FIGS. 11A and 11B are a front view and a rear view of the multi-band phase shifter system 200 respectively, and FIGS. 11C and 11D are respectively a front view and a rear view of the multi-band phase shifter system 200 with the corresponding support frame removed; As shown in the figure, the multi-band phase shifter system 200 may include two multi-band phase shifter components 100 arranged side by side. The two multi-band phase shifter components 100 can be arranged in mirror symmetry. As mentioned above, each multi-band phase shifter assembly 100 may include a first substrate 101, a first phase shifter or outer phase shifter 110, and a second phase shifter or inner phase shifter 130. The first substrate 101 can be vertically placed on the reflection board (not shown) of the base station antenna. Both the outer phase shifter 110 and the inner phase shifter 130 may be formed as a rotary wiper arm phase shifter and arranged into a superimposed structure, i.e., the outer phase shifter 110 is arranged on the first surface or an inner surface of the first substrate 101, and the inner phase shifter 130 is arranged on the second surface or outer surface of the first substrate 101.

The multi-band phase shifter system 200 also includes a double-layer connecting rod assembly that drives the phase shifter wiper arm of the multi-band phase shifter assembly 100 to pivot. As shown in FIGS. 11C and 11D, the double-layer connecting rod assembly includes an upper connecting rod assembly 260 and a lower connecting rod assembly 280 which are arranged between the two multi-band phase shifter assemblies. The upper connecting rod assembly 260 drives the wiper arms 150 of the outer phase shifters 110 of the two multi-band phase shifter assemblies 100 to synchronously pivot, and the lower connecting rod assembly 280 is arranged below the upper connecting rod assembly 260 and drives the wiper arms 155 of the inner phase shifters 130 of the two multi-band phase shifter assemblies 100 to synchronously pivot. The multi-band phase shifter system 200 also includes a support frame assembly that supports each multi-band phase shifter assembly 100 above the reflection board. As shown in the FIGS. 11A and 11B, the support frame assembly includes a front end support frame 220 and a back side support frame 240 which respectively supports a front end portion and a rear end portion of each of the two multi-band phase shifter assemblies 100.

Figure 12:
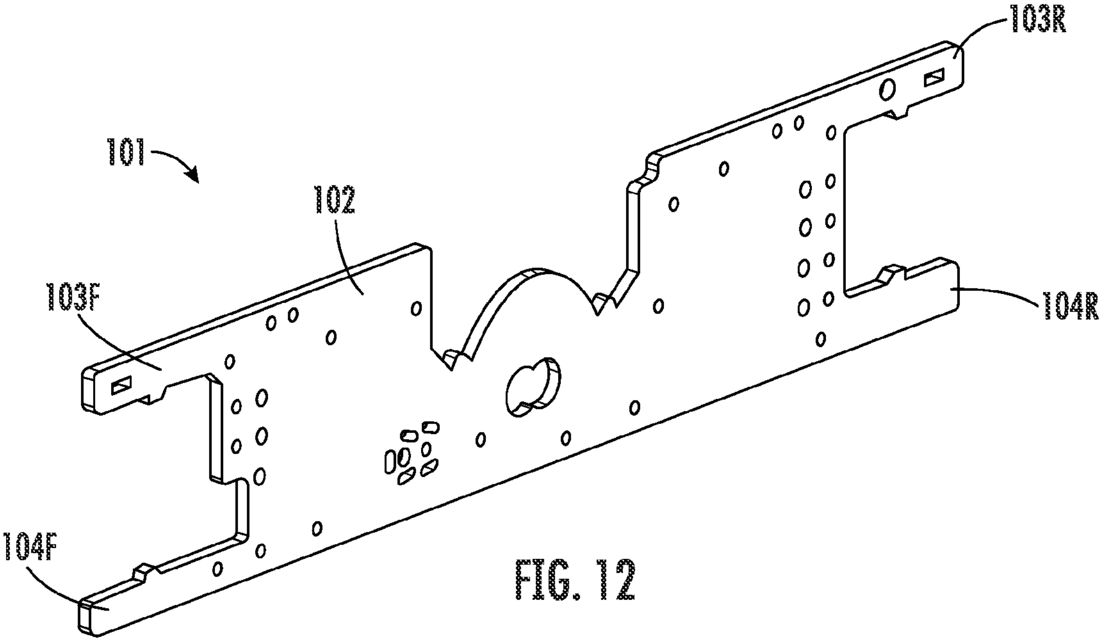
FIG. 12 is a perspective view of the first substrate of the multi-band phase shifter assembly.

FIG. 12 is a perspective view of the first substrate 101. As shown in the figure, the first substrate 101 includes a flat board 102. The outer surface of board 102 is used to connect and support the outer phase shifter 110, and the inner surface of board 102 is not only used to connect and support the inner phase shifter 130, but is also used to connect and support upper connecting rod assembly 260 and lower connecting rod assembly 280. The first substrate 101 further includes an upper insertion rod 103F extending forward from the front end of the board body 102 and a lower insertion rod 104F for connecting to the front support frame 220. The first substrate 101 further includes an upper insertion rod 103R extending from the rear end of the board 102 and a lower insertion rod 104R for connecting to the rear support frame 240.

Figure 13A:
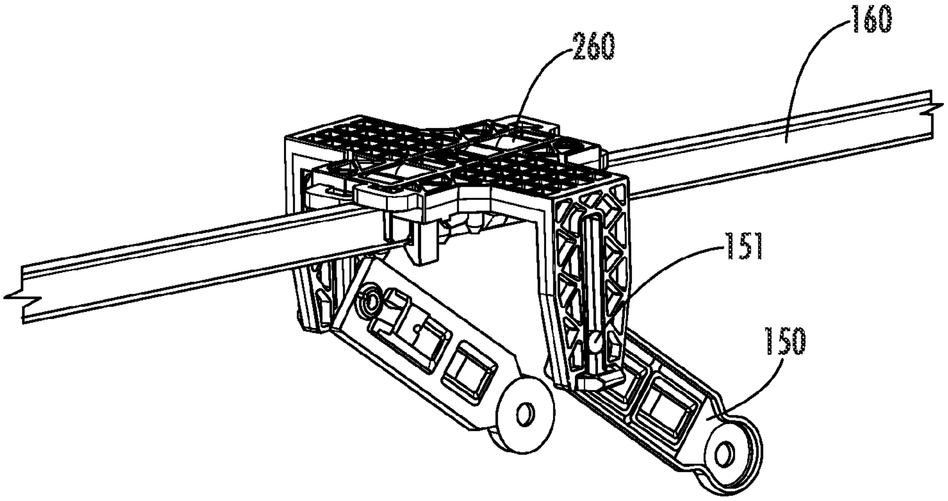
FIGS. 13A and 13B are respectively a perspective view and a front view of an upper connecting rod assembly connected to a wiper arm of an outer phase shifter.
Figure 13B:
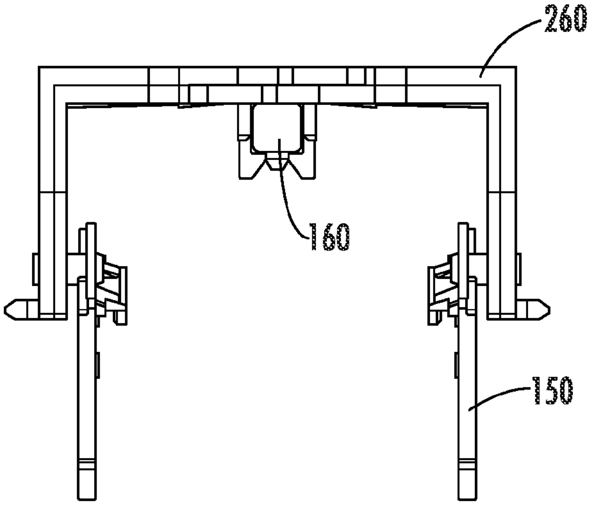
Figure 14A:
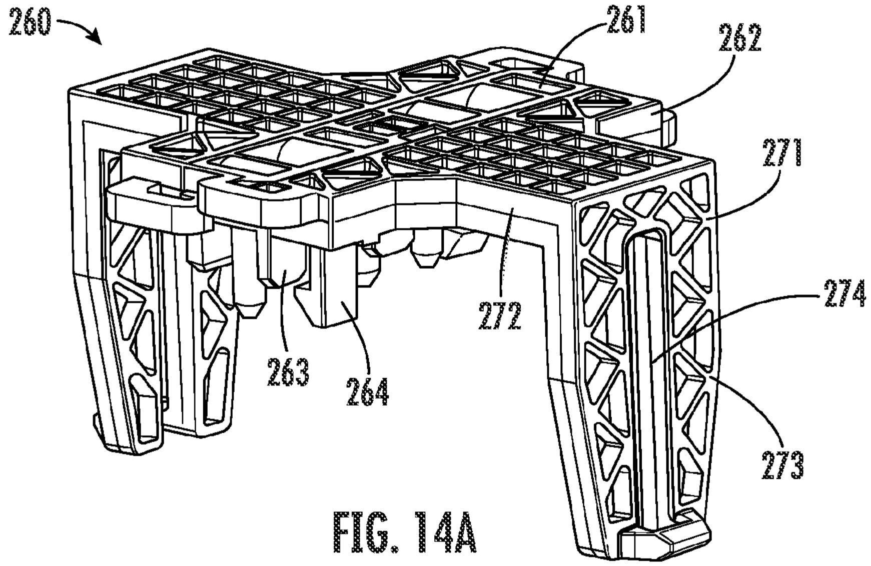
FIGS. 14A-14C are respectively a separate perspective view, a front view, and a bottom view of the upper connecting rod assembly.
Figure 14B:
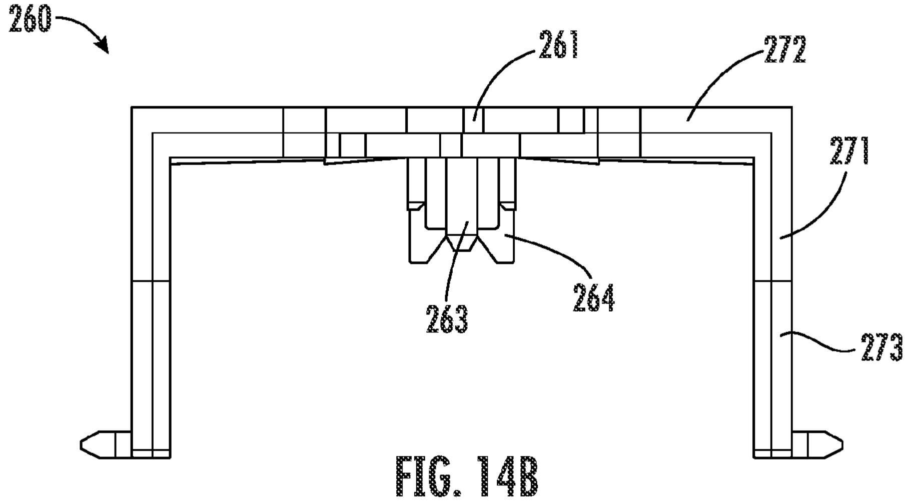
Figure 14C:
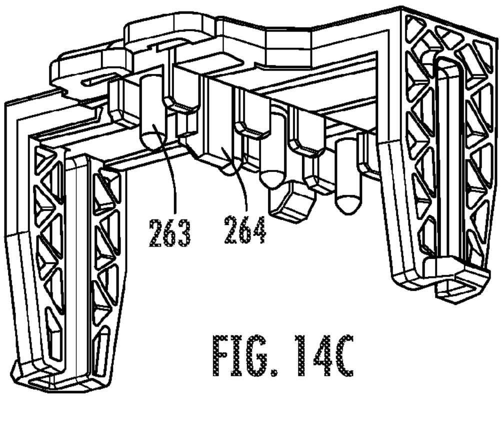

FIGS. 13A and 13B are respectively the perspective view and front view of the upper connecting rod assembly 260 connected to the wiper arm 150 of the outer phase shifter 110, and FIGS. 14A-14C are respectively the separate perspective view, front view and bottom view of the upper connecting rod assembly 260. As shown in the figure, the upper connecting rod assembly 260 includes a connecting rod connecting block 261 and two wiper arms connecting blocks 271 located at the left and right sides of the connecting rod connecting block 261 in a transverse direction. The connecting rod connecting block 261 is used to connect to an upper connecting rod 160. The connecting rod connecting block 261 includes a block body 262. The block body 262 is elongated along the longitudinal direction and is arranged on the upper connecting rod 160. The connecting rod connecting block 261 further includes one or more positioning columns 263 extending downwards from the block body 262. The positioning columns 263 may be arranged on the lower surface of the block body 262 along the longitudinal direction, and the upper connecting rod 160 may be provided with positioning holes (not shown) in corresponding numbers and positions on the upper surface thereof along the longitudinal direction. The positioning columns 263 can be inserted into the corresponding positioning holes to secure the connecting rod connecting block 261 on the upper connecting rod 160 in place. The connecting rod connecting block 261 further includes a plurality of holding hooks 264 extending downwards from the block body 262. A part of holding hooks 264 may be arranged at the lateral edge of one side of the lower surface of the block body 262 along the longitudinal direction and face inwards, while the other part of the holding hooks 264 may be arranged at the lateral edge of the opposite side of the lower surface of the block body 262 along the longitudinal and face inwards. The holding hooks 264 at the lateral edges of both sides work together to removably hold the upper connecting rod 160 therebetween. In some embodiments, the plurality of holding hooks 264 may be arranged sequentially and alternately at the lateral edges of both sides of the lower surface of block body 262.

Each wiper arm connecting block 271 is connected to the wiper arm 150 of the outer phase shifter 110 and includes a horizontal arm 272 and a vertical arm 273 which are connected to each other. Each wiper arm connecting block 271 is substantially L-shaped. The horizontal arm 272 horizontally extends outwards from the left part or right part of the connecting rod connecting block 261. The vertical arm 273 vertically extends downwards from the outer end of the horizontal arm 272, and is provided with a sliding groove 274 extending in a longitudinal direction. The sliding groove 274 is used to receive a sliding column 151 on the free end of the wiper arm 150. When the wiper arm 150 is driven by the upper connecting rod 160 to pivot around a pivot shaft thereof, the sliding column 151 may reciprocate in the sliding groove 274. In some embodiments, the lower end of the vertical arm 273 may be bent outwards, and the lower end of the sliding groove 274 is opened downwards to facilitate the mounting of the sliding column 151 from the backward to the sliding groove 274. The two wiper arm connecting blocks 271 and the connecting rod connecting block 261 may be respectively formed and mutually connected by means of snap-fit connection, welding, bonding, etc., or the two wiper arm connecting blocks 271 can be integrally formed with the connecting rod connecting block 261. The upper connecting rod 160 is supported slidably between the inner surfaces of the first substrates 101 of the two multi-band phase shifter assemblies 100 by two or more upper connecting rod brackets 161 (see FIG. 10A). Therefore, the upper connecting rod assembly 260 is slidably supported between the two multi-band phase shifter assemblies 100.

Figure 15A:
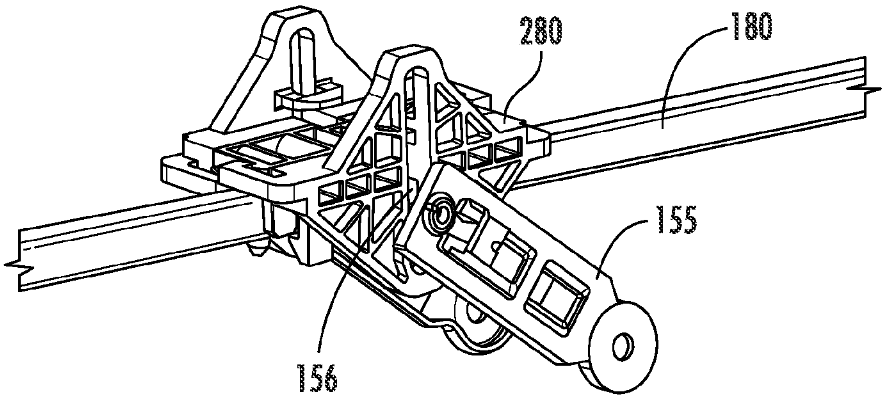
FIGS. 15A and 15B are respectively a perspective view and a front view of a lower connecting rod assembly connected to a wiper arm of an inner phase shifter.
Figure 15B:
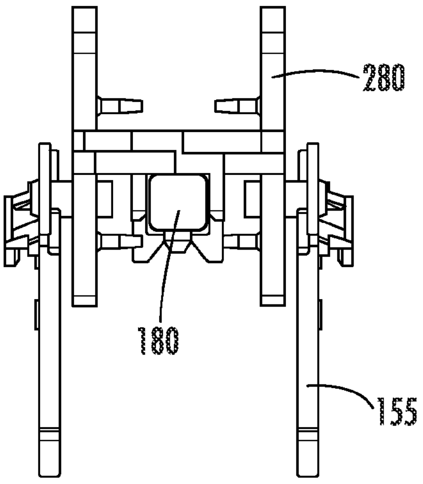
Figure 16A:
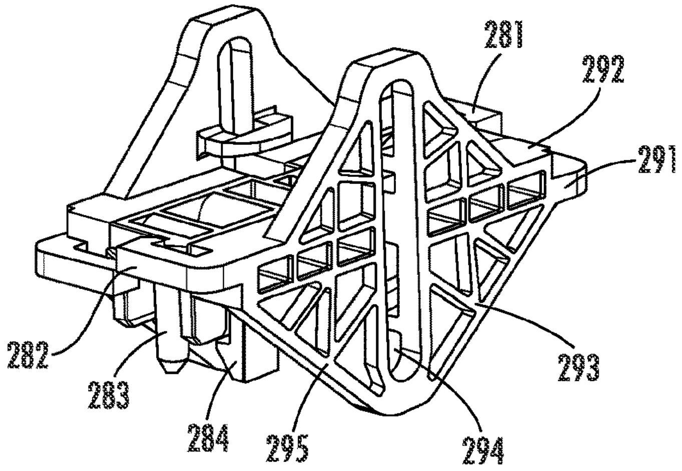
FIGS. 16A-16C are respectively a separate perspective view, a front view, and a bottom view of the lower connecting rod assembly.
Figure 16B:
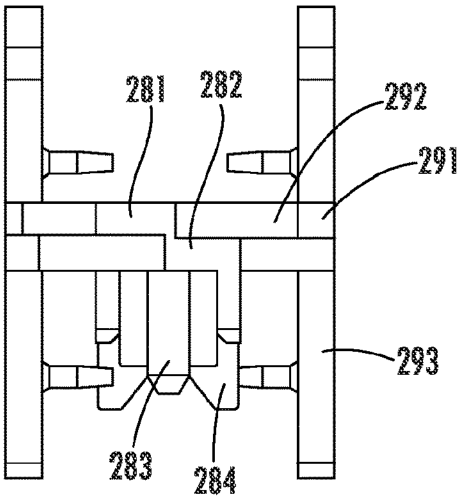
Figure 16C:
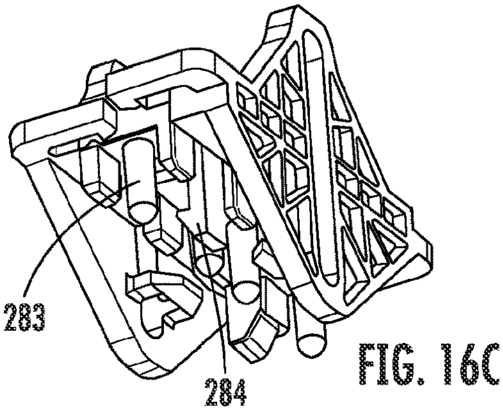

FIG. 15A and FIG. 15B are respectively the perspective view and front view of the lower connecting rod assembly 280 connected to the wiper arm 155 of the inner phase shifter 130, and FIGS. 16A-16C are respectively the separate perspective view, front view and bottom view of the lower layer connecting rod assembly 280. As shown in the figure, the lower connecting rod assembly 280 includes a connecting rod connecting block 281 and two wiper arms connecting blocks 291 located at the left and right sides of the connecting rod connecting block 281 in a transverse direction. The connecting rod connecting block 281 is used to connect to a lower connecting rod 180. The connecting rod connecting block 281 includes a block body 282. The block body 282 is elongated along the longitudinal direction and is arranged on the lower connecting rod 180. The connecting rod connecting block 281 also includes one or more positioning columns 283 extending downwards from the block body 282. The positioning columns 283 may be arranged on the lower surface of the block body 282 along the longitudinal direction, and the lower connecting rod 180 may be provided with positioning holes (not shown) in the corresponding numbers and positions on the upper surface thereof along the longitudinal direction. The positioning columns 283 can be inserted into the corresponding positioning holes to secure the connecting rod connecting block 281 on the lower connecting rod 180 in place. The connecting rod connecting block 281 also includes a plurality of holding hooks 284 extending downwards from the block body 282. A part of holding hooks 284 may be arranged at the lateral edge of one side of the lower surface of the block body 282 along the longitudinal direction and face inwards, while the other part of the holding hooks 284 may be arranged at the lateral edge of the opposite side of the lower surface of the block body 282 along the longitudinal direction and face inwards. The holding hooks 284 at the lateral edges of both sides work together to removably hold the lower connecting rod 180 therebetween. In some embodiments, the plurality of holding hooks 284 may be arranged sequentially and alternately at the lateral edges of both sides of the lower surface of the block body 282. In some embodiments, the connecting rod connecting block 281 and the connecting rod connecting block 261 are roughly of the same structure, thus they can be exchanged during installation.

Each wiper arm connecting block 291 is connected to the wiper arm 155 of the inner phase shifter 130, and includes a horizontal arm 292 and vertical arms 293 which are connected to each other. The horizontal arm 292 outwards extends horizontally from the left or right side of the connecting rod connecting block 281. The vertical arm 293 extends vertically from the outer end of an extension part 292 upwards and downwards, and is provided with a sliding groove 294 extending in the longitudinal direction. The sliding groove 294 is used to receive the sliding column 156 on the free end of the wiper arm 155. When the wiper arm 155 is driven by the lower connecting rod 180 to pivot around a pivot shaft thereof, the sliding column 151 may reciprocate in the sliding groove 294. In some embodiments, enhancement ribs 295 are located between the vertical arm 293 and the horizontal arm 292 to enhance the strength of the two. The two wiper arm connecting blocks 291 and the connecting rod connecting block 281 may be respectively formed and mutually connected by means of snap-fit connection, welding, bonding, etc., or the two wiper arm connecting blocks 291 can be integrally formed with the connecting rod connecting block 281. The lower connecting rod 180 is supported slidably between the inner surfaces of the first substrates 101 of the two multi-band phase shifter assemblies 100 by two or more lower connecting rod brackets 181, and is located below the upper connecting rod 160. Therefore, the lower connecting rod assembly 280 is supported slidably between the two multi-band phase shifter assemblies 100, and is located below and separated from the upper connecting rod assembly 260.

Figure 17A:
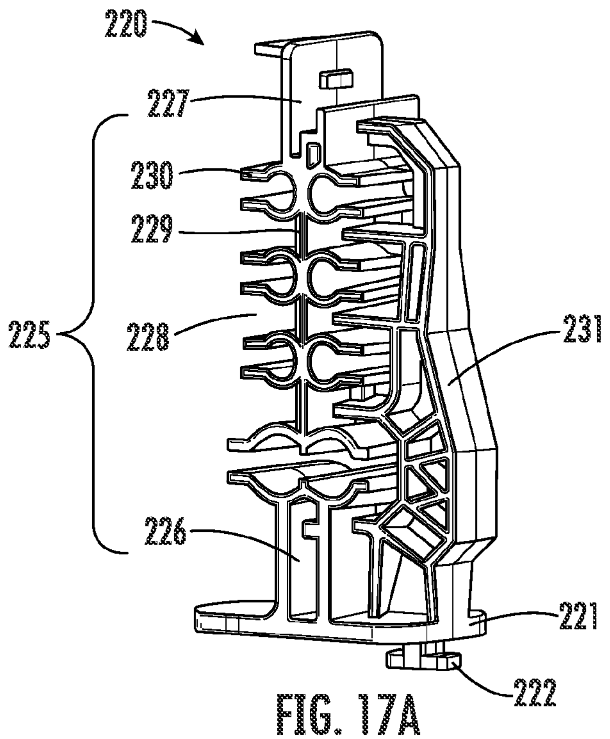
FIGS. 17A and 17B are a perspective view and a front view of a front support frame respectively.
Figure 17B:
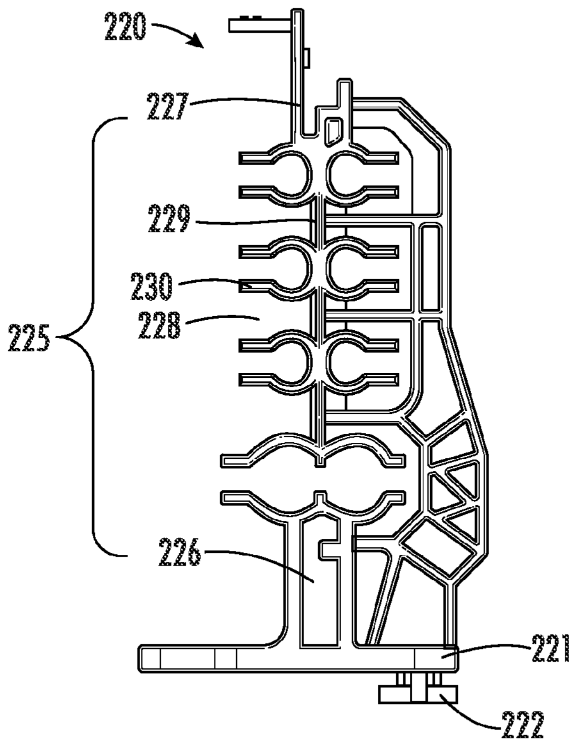

The multi-band phase shifter system 200 includes two support frame components. Front support frames 220 and rear support frames 240 of the two support frame components are respectively used to support the front and rear ends of the two multi-band phase shifter components 100. Specifically, a pair of front support frames 220 are used to support the front ends of the two multi-band phase shifter components 100 and are arranged in mirror symmetry. FIG. 17A and FIG. 17B are the perspective view and front view of one of the front support frames 220 respectively. As illustrated in the figure, the front support frame 220 may include a bottom plate 221 and a frame body 225 extending upwards from the bottom plate 221. The bottom plate 221 includes a projection 222 protruding from its lower surface, and the front support frame 220 may be detachably connected to the reflection board (not shown) of the base station antenna through a convex-convex fitting. In some embodiments, the projection 222 may be of an inverted T-shape, and this inverted T-shape may pass downwardly through the groove of the reflection board, and the lower end props against the lower surface of the reflection board, so that the front support frame 220 is removably connected to the reflection board.

The frame body 225 includes a lower substrate receiving port 226, an upper substrate receiving port 227 and a holding claw array 228 located therebetween. The lower substrate receiving port 226 is fixed to the bottom plate 221 and is used to accommodate the lower insertion rod 104F of the first substrate 101. The cross-sectional shapes of the lower substrate receiving port 226 and the lower insertion rod 104F can be designed to match. The holding claw array 228 includes an intermediate plate 229 and multiple pairs of cable holding claws 230 extending outwards from the left and right sides of the intermediate plate 229. The intermediate plate 229 extends upwards from the top wall of the lower substrate receiving port 226. The multiple pairs of cable holding claws 230 are used to hold various cables of the outer phase shifter 110 and the inner phase shifter 130. In some embodiments, the multiple pairs of cable holding claws 230 are arranged in a longitudinal direction on the intermediate plate 229, the lowermost pair of cable holding claws 230 is used to hold input cables of the outer phase shifter 110 and the inner phase shifter 130, while the other pairs of cable holding claws 230 are used to hold output cables of the outer phase shifter 110 and the inner phase shifter 130. In some embodiments, the lowermost pair of cable holding claws 230 are open to each other, that is, the intermediate plate 229 is disconnected at the lowermost pair of cable holding claws 230 to better adapt to the input cable with a larger diameter. The upper substrate receiving port 227 is fixed at the top of the intermediate plate 229 and is used to accommodate the upper insertion rod 103F of the first substrate 101. The cross-sectional shapes of the upper substrate receiving port 227 and the upper insertion rod 103F can be designed to match. The lower substrate receiving port 226 and the upper substrate receiving port 227 can be designed to be closed or have an opening (as shown in the figure, the lower substrate receiving port 226 is closed and the upper substrate receiving port 227 is opened).

The front support frame 220 may further include enhancement ribs 231 to enhance the connection strength of the frame body 225. The enhancement ribs 231 extend upwards from the bottom plate 221, and are connected at multiple points to and support the lower substrate receiving port 226, the upper substrate receiving port 227 and the holding claw array 228 of the support frame 225 in a vertical direction. In some embodiments, the contours of the enhancement ribs 231 may be designed to be of an arc shape or interface shape for fixing other accessories.

Figure 18A:
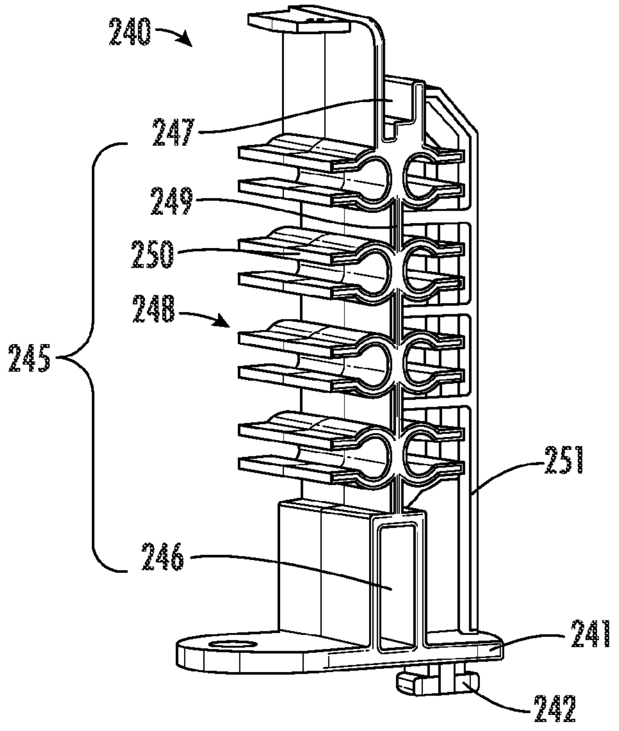
FIGS. 18A and 18B are a perspective view and a front view of a rear support frame respectively.
Figure 18B:
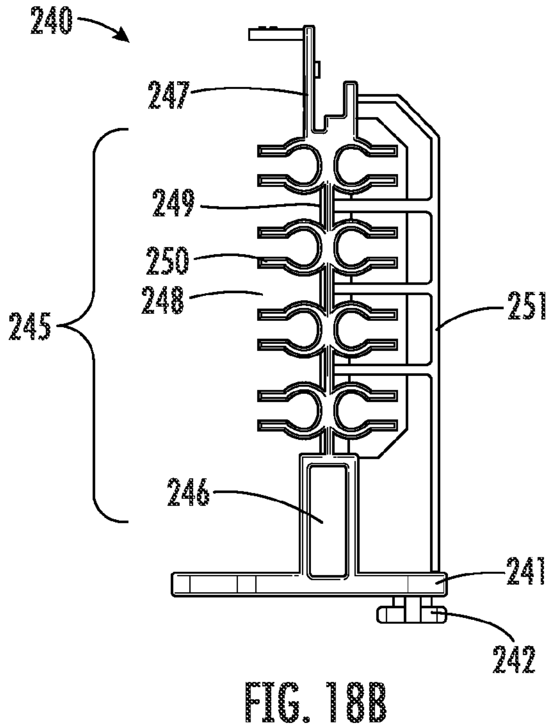

A pair of rear support frames 240 are used to support the rear ends of two multi-band phase shifter components 100, and they are arranged in mirror symmetry. FIGS. 18A and 18B are perspective and front views of one of the rear support frames 240 respectively. As illustrated in the figure, the rear support frame 240 may include a bottom plate 241 and a frame body 245 extending upwards from the bottom plate 241. The bottom plate 241 includes a projection 242 producing from its lower surface, and the rear support frame 240 may be detachably connected to the reflection board (not shown) of the base station antenna through a convex-concave fitting. In some embodiments, the projection 242 may be of an inverted T-shape, and the inverted T-shape may pass downwards through the groove of the reflection board, and the lower end props against the lower surface of the reflection board, so that the rear support frame 240 is removably connected to the reflection board.

The frame body 245 includes a lower substrate receiving port 246, an upper substrate receiving port 247 and a holding claw array 248 located therebetween. The lower substrate receiving port 246 is fixed to the bottom plate 241 and is used to accommodate the lower insertion rod 104R of the first substrate 101. The cross-sectional shapes of the lower substrate receiving port 246 and the lower insertion rod 104R can be designed to match. The holding claw array 248 includes an intermediate plate 249 and multiple pairs of cable holding claws 250 extending outwards from the left and right sides of the intermediate plate 249. The intermediate plate 249 extends upwards from the top wall of the lower substrate receiving port 226. The multiple pairs of cable holding claws 250 are used to hold various cables of the outer phase shifter 110 and the inner phase shifter 130.

In some embodiments, the multiple pairs of cable holding claws 250 are arranged on the intermediate plate 249 in a vertical direction and are used to hold output cables of the outer phase shifter 110 and the inner phase shifter 130. The upper substrate receiving port 247 is fixed at the top of the intermediate plate 249 and is used to accommodate the upper insertion rod 103R of the first substrate 101. The cross-sectional shapes of the upper substrate receiving port 247 and the upper insertion rod 103R can be designed to match. The lower substrate receiving port 246 and the upper substrate receiving port 247 can be designed to be closed or have an opening (as shown in the figure, the lower substrate receiving port 246 is closed, and the upper substrate receiving port 247 is opened).

The rear support frame 240 may further include enhancement ribs 251 to enhance the connection strength of the frame body 245. The enhancement ribs 251 extend upwards from the bottom plate 241, and are connected at multiple points to and support the lower substrate receiving port 246, the upper substrate receiving port 247 and the holding claw array 248 of the frame body 245 in a vertical direction. In some embodiments, the contours of the enhancement ribs 251 may be designed to be of an arc shape or interface shape for fixing other accessories.

In other embodiments, the support frame assembly, including the front support frame 220 and the rear support frame 240, may not only be used to support the printed circuit board of the phase shifter, but also may be used to support any other printed circuit boards inside the base station antenna, such as the printed circuit boards of duplexers, the printed circuit boards of power dividers, etc.

Figure 19:
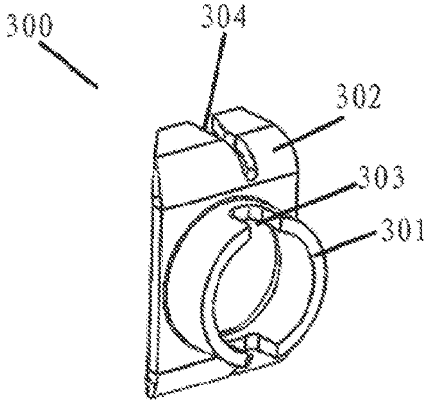
FIG. 19 is a separate perspective view of the cable clamp used for the multi-band phase shifter assembly.
Figure 20A:
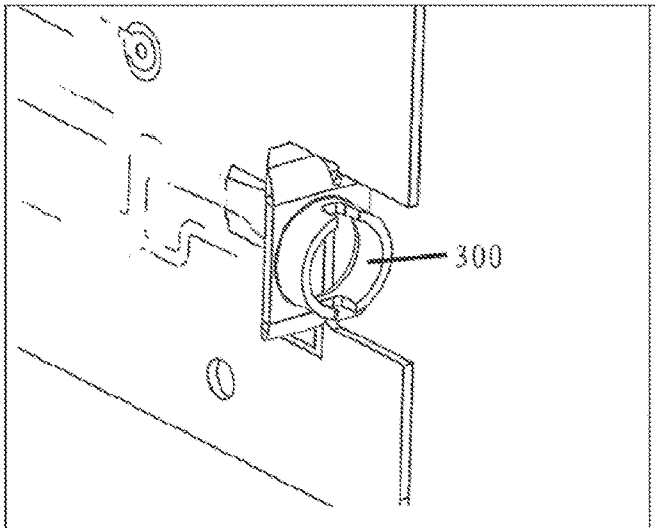
FIGS. 20A-20D are perspective views of the cable clamp at different angles in the mounting state.
Figure 20B:
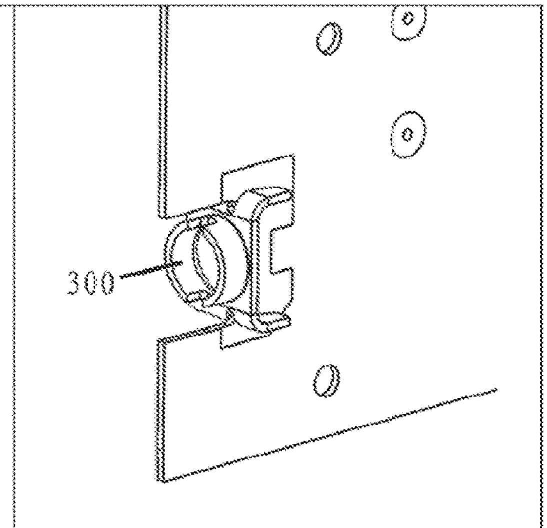
Figure 20C:
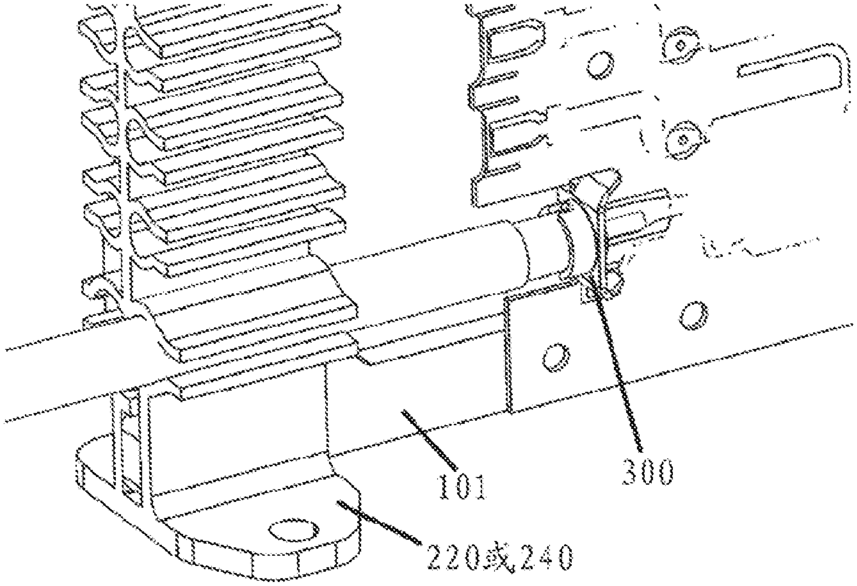
Figure 20D:
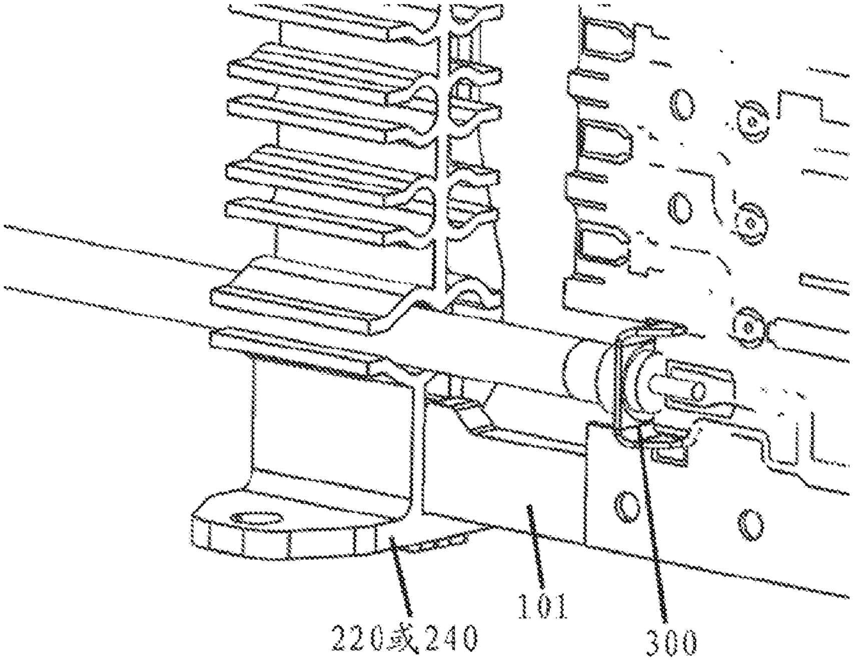

FIG. 19 is a separate perspective view of the cable clamp 300 used for the multi-band phase shifter assembly 100, and FIG. 20A-20D are the perspective view of the cable clamp 300 in the mounting state respectively. A cable clamp 300 is used to fixedly connect the input cable or output cable to the printed circuit board of the phase shifter (such as the outer phase shifter 110 or the inner phase shifter 130). As shown in the figure, the cable clamp 300 includes a connecting ring 301 and a connecting plate 302 that are connected to each other. The connecting ring 301 is used to connect to the input cable or the output cable, while the connecting plate 302 is used to connect to the printed circuit board of the phase mover. The connecting ring 301 has a roughly circular outer wall to accommodate an outer cable conductor. The connecting ring 301 is provided with one or more openings 303 in the outer wall. Soldering flux may be delivered between the outer cable conductor and the connecting ring 301 through the openings 303 to solder the outer cable conductor to the connecting ring 301, while an inner cable conductor is soldered to the printed circuit board of the phase shifter. The connecting plate 302 outwards extends radially from the outer wall of the connecting ring 301 (for example, at the rear edge of the outer wall), and cuts 304 are respectively formed in the upper part and the lower part thereof. The cuts 304 separately accommodate the edge of the printed circuit board of the phase shifter, and then are fixed to the printed circuit board by means of welding, etc.

The assembly process of the multi-band phase shifter system 200 will be described hereafter. Firstly, ends of each cable (including the input cable and the output cable) used for the phase shifter (including the outer phase shifter 110 or the inner phase shifter 130 of the two multi-band phase shifter assemblies 100) are prepared so that the inner conductor and the outer conductor are exposed in sequence. The prepared end of the cable is inserted into the connecting ring 301 penetrating through the cable clamp 300, and the inner conductor of the cable is soldered to the printed circuit board of the phase shifter. Then, the connecting plate 302 of the cable clamp 300 is welded at the cuts 304 and 305 to the printed circuit board of the phase shifter (including the outer phase shifter 110 or the inner phase shifter 130), and the connecting ring 301 of the cable clamp 300 is welded to the outer conductor of the cable at openings 303 of the cable.

In each of the two multi-band phase shifter assemblies 100, the outer phase shifter 110 and the inner phase shifter 130 are respectively fixed to the inner surface and the outer surface of the plate body 102 of the first substrate 101 of each multi-band phase shifter assembly 100 by fastening pieces such as rivets, and the wiper arms 150 and 155 are mounted on the outer phase shifter 110 and the inner phase shifter 130. The upper insertion rod 103F and the lower insertion rod 104F at the front end of the first substrate 101 are respectively inserted into the upper substrate receiving port 227 and the lower substrate receiving port 226 of the front support frame 220 so as to connect the first substrate 101 to the front support frame 220. The upper insertion rod 103R and the lower insertion rod 104R at the rear end of the first substrate 101 are respectively inserted into the upper substrate receiving port 247 and the lower substrate receiving port 246 of the rear support frame 240 so as to connect the first substrate 101 to the rear support frame 240.

The positioning holes of the upper connecting rod 160 are aligned to the positioning columns 263 of the connecting rod connecting block 261, and the upper connecting rod 160 is pushed towards the connecting rod connecting block 261. The holding hooks 264 of the connecting rod connecting block 261 are outwards transformed elastically and restored to original shapes after the upper connecting rod 160 is accommodated, thereby connecting the upper connecting rod 160 to the upper connecting rod assembly 260. Similarly, the positioning holes of the lower connecting rod 180 are aligned to the positioning columns 283 of the connecting rod connecting block 281, and the lower connecting rod 180 is pushed towards the connecting rod connecting block 281. The holding hooks 284 of the connecting rod connecting block 281 are outwards transformed elastically and restored to original shapes after the lower connecting rod 180 is accommodated, thereby connecting the lower connecting rod 180 to the lower connecting rod assembly 280.

For the first multi-band phase shifter assembly 100 in the two multi-band phase shifter assemblies 100, the projection 222 of the front support frame 220 and the projection 242 of the rear support frame 240 respectively penetrate through the groove in the reflection board to removably connect the first multi-band phase shifter assembly 100 to the reflection board. The upper connecting rod assembly 260 and the lower connecting rod assembly 280 may be slidably connected to the inner surface of the first substrate 101 of the first multi-band phase shifter assembly 100 via the upper connecting rod bracket 161 and the lower connecting rod bracket 181 respectively. For the second multi-band phase shifter assembly 100 in the two multi-band phase shifter assembly 100, the projection 222 of the front support frame 220 and the projection 242 of the rear support frame 240 respectively penetrate through the groove in the reflection board to removably connect the second multi-band phase shifter assembly 100 to the reflection board. The upper connecting rod assembly 260 and the lower connecting rod assembly 280 may be slidably connected to the inner surface of the first substrate 101 of the second multi-band phase shifter assembly 100 via the upper connecting rod bracket 161 and the lower connecting rod bracket 181 respectively. Therefore, the assembly of the multi-band phase shifter system 200 is completed.

The multi-band phase shifter according to the present disclosure reduces the space required for installation and greatly improves the spatial utilization rate of the base station antenna by two multi-band phase shifter assemblies arranged side by side, as well as the double-layer connecting rod assembly and a pair of support frame assemblies.

Although exemplary embodiments of the present disclosure have been described, those skilled in the art should understand that many variations and modifications are possible in the exemplary embodiments without materially departing from the spirit and scope of the present disclosure. Therefore, all variations and changes are included in the protection scope of the present disclosure defined by the claims. The present disclosure is defined by the attached claims, and equivalents of these claims are also included.

That which is claimed is:

1. A multi-band phase shifter assembly, comprising:

a first substrate;

a first rotary wiper arm phase shifter arranged on a first surface of the first substrate, the first rotary wiper arm phase shifter being configured to perform a phase shift operation on a first radio frequency signal in a first frequency band;

a second rotary wiper arm phase shifter arranged on a second surface of the first substrate opposite to the first surface, the second rotary wiper arm phase shifter being configured to perform a phase shift operation on a second radio frequency signal in a second frequency band, the second frequency band being different from the first frequency band;

first filters, which are configured to pass the first radio frequency signal while blocking the second radio frequency signal, wherein an input end of each of the first filters is connected to a corresponding output port of the first rotary wiper arm phase shifter;

second filters, which are configured to pass the second radio frequency signal while blocking the first radio frequency signal, wherein an input end of each of the second filters is connected to a corresponding output port of the second rotary wiper arm phase shifter; and a first conductive structure spanning the first substrate, the first conductive structure being configured to electrically connect an output end of one of the first filters with a corresponding output end of one of the second filters so as to be electrically connected together to a first common output port of the multi-band phase shifter assembly, a second substrate;

a third rotary wiper arm phase shifter arranged on a first surface of the second substrate;

a fourth rotary wiper arm phase shifter arranged on a second surface of the second substrate opposite the first surface;

third filters, which are configured to pass the third radio frequency signal while blocking the fourth radio frequency signal, wherein an input end of each third filter is connected to a corresponding output port of the third rotary wiper arm phase shifter;

fourth filters, which are configured to pass the fourth radio frequency signal while blocking the third radio frequency signal, wherein an input end of each fourth filter is connected to a corresponding output port of the fourth rotary wiper arm phase shifter; and a second conductive structure spanning the second substrate, the second conductive structure being configured to electrically connect an output end of one of the third filters with a corresponding output end of one of the fourth filters so as to be electrically connected together to a second common output port of the multi-band phase shifter assembly;

a connecting rod assembly that includes a first connecting rod that is coupled to the first rotary wiper arm and the third rotary wiper arm and a second connecting rod that is coupled to the second rotary wiper arm and the fourth rotary wiper arm.

2. The multi-band phase shifter assembly according to claim 1, wherein:

the output ports of the first rotary wiper arm phase shifter comprise a first output port and a second output port, and the output ports of the second rotary wiper arm phase shifter comprise a third output port and a fourth output port, the first rotary wiper arm phase shifter further comprises a first input port, a first printed trace electrically connected to the first output port and the second output port, and a first wiper arm, the first wiper arm is configured to couple the first input port to the first printed trace and is capable of sliding relative to the first printed trace; and the second rotary wiper arm phase shifter further comprises a second input port, a second printed trace electrically connected to the third output port and the fourth output port, and a second wiper arm, the second wiper arm is configured to couple the second input port to the second printed trace and is capable of sliding relative to the second printed trace.

3. The multi-band phase shifter assembly according to claim 2, wherein the first rotary wiper arm phase shifter and the second rotary wiper arm phase shifter are superimposed.

4. The multi-band phase shifter assembly according to claim 2, wherein the first printed trace and the second printed trace at least partially extend along respective first and second arc-shaped trajectories.

5. The multi-band phase shifter assembly according to claim 4, wherein the first arc-shaped trajectory of the first printed trace and the second arc-shaped trajectory of the second printed trace substantially extend overlapping with each other.

6. The multi-band phase shifter assembly according to claim 1, wherein a channel is provided on the first substrate, and the first conductive structure spans the first substrate through the channel.

7. The multi-band phase shifter assembly according to claim 6, wherein a first end portion of the first conductive structure is electrically connected to the output end of the one of the first filters through a first opening, and a second end portion of the first conductive structure is electrically connected to the output end of the one of the second filters through a second opening, thereby achieving an electrical connection between the output end of the one of the first filters and the output end of the one of the second filters.

8. The multi-band phase shifter assembly according to claim 3, wherein the first rotary wiper arm phase shifter and the second rotary wiper arm phase shifter are superimposed such that a contour of the first rotary wiper arm phase shifter and a contour of the second rotary wiper arm phase shifter substantially overlap.

9. The multi-band phase shifter assembly according to claim 1, wherein the first rotary wiper arm phase shifter and the plurality of first filters are integrated on a first printed circuit board, and the second rotary wiper arm phase shifter and the plurality of second filters are integrated on a second printed circuit board.

10. The multi-band phase shifter assembly according to claim 1, wherein the first filters and/or the second filters are respectively configured as band-rejection filters or band-pass filters.

11. The multi-band phase shifter assembly according to claim 1, wherein the first filters and/or the second filters are respectively configured as notch filters.

12. The multi-band phase shifter assembly according to claim 1, wherein the first filters and/or the second filters are respectively configured as resonant stubs or stepped impedance microstrip lines.

13. The multi-band phase shifter assembly according to claim 1, wherein the first substrate and the second substrate extend in parallel planes, and at least one of the first connecting rod and the second connecting rod extend in a region between the parallel planes.

14. The multi-band phase shifter assembly according to claim 1, wherein the first substrate and the second substrate extend in planes that intersect at an oblique angle.

15. The multi-band phase shifter assembly according to claim 1, wherein the first substrate and the second substrate extend in parallel planes, wherein the first rotary wiper arm phase shifter and the third rotary wiper arm phase shifter are positioned in between the second rotary wiper arm phase shifter and the fourth rotary wiper arm phase shifter.

16. The multi-band phase shifter assembly according to claim 15, wherein the connecting rod assembly further comprises a first linkage piece that is attached to the first connecting rod that is coupled to the first rotary wiper arm and the third rotary wiper arm and a second linkage piece that is attached to the first connecting rod that is coupled to the first rotary wiper arm and the third rotary wiper arm.

* * * * *